United States Patent
Schulze et al.

(10) Patent No.: US 11,144,342 B2
(45) Date of Patent: Oct. 12, 2021

(54) WORKLOAD EXECUTION IN A DISTRIBUTED COMPUTING INFRASTRUCTURE ON CANDIDATE NODES IDENTIFIED THROUGH PLURAL TEST DEPLOYMENTS

(71) Applicant: International Business Machines Corporation, Armonk, NY (US)

(72) Inventors: Ruediger Schulze, Boeblingen (DE); Bernhard Dierberger, Tuebingen (DE); Turgut Aslan, Nufringen (DE); Joachim Frank, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/365,995

(22) Filed: Mar. 27, 2019

(65) Prior Publication Data
US 2020/0310847 A1    Oct. 1, 2020

(51) Int. Cl.
*G06F 9/455*    (2018.01)
*G06F 11/30*    (2006.01)
(Continued)

(52) U.S. Cl.
CPC ........ *G06F 9/45558* (2013.01); *G06F 11/301* (2013.01); *H04L 67/10* (2013.01);
(Continued)

(58) Field of Classification Search
CPC ............... G06F 9/45558; G06F 11/301; G06F 2009/5591; G06F 11/3414; G06F 11/3428; H04L 67/10
See application file for complete search history.

(56) References Cited

U.S. PATENT DOCUMENTS 8,412,822 B1 *    4/2013    Weinman, Jr. ........ G06F 9/4843
                                                    709/225
9,830,192 B1 *    11/2017   Crouchman ........ G06F 9/45558
(Continued)

FOREIGN PATENT DOCUMENTS

CN    107171843 A    9/2017
CN    104104545 B    10/2017

OTHER PUBLICATIONS

Garg et al., "A framework for ranking of cloud computing services", Future Generation Computer Systems vol. 29, Issue 4, Jun. 2013, pp. 1012-1023, <http://www.buyya.com/papers/RankingClouds-FGCS.pdf>.

(Continued)

*Primary Examiner* — Michael W Ayers
(74) *Attorney, Agent, or Firm* — Andrew Aubert

(57) ABSTRACT

A method for executing, in a distributed computing infrastructure (comprising a broker node and work nodes), a job workload having a requirement related to a resource. Test deployment comprises: executing a test workload observing the requirement and varying the resource; for each test workload execution, receiving a metric quantifying a response of the test node to the status of the resource. The broker node: performs the test deployment with the test workload being a measuring workload having the requirement, the test node being a first and second candidate node, and the metric respectively being a first and second metric; determines a cost impact function of the metric; respectively determines a minimum of a first and second total cost function determined from the first and second metric and the cost impact function; and causes an executing node selected from the candidate nodes based on the minima to execute the job workload.

24 Claims, 26 Drawing Sheets

(51) Int. Cl.
*H04L 29/08* (2006.01)
*G06F 11/34* (2006.01)

(52) U.S. Cl.
CPC ...... *G06F 11/3414* (2013.01); *G06F 11/3428* (2013.01); *G06F 2009/45591* (2013.01); *H04L 67/1023* (2013.01)

(56) References Cited

U.S. PATENT DOCUMENTS

| | | | | |
|---|---|---|---|---|
| 9,854,031 | B2 | 12/2017 | Ha et al. | |
| 2002/0199123 | A1* | 12/2002 | McIntyre | H04L 63/104 726/3 |
| 2003/0236700 | A1 | 12/2003 | Arning et al. | |
| 2010/0198960 | A1* | 8/2010 | Kirschnick | G06F 11/3433 709/224 |
| 2011/0078303 | A1* | 3/2011 | Li | H04L 67/1012 709/224 |
| 2011/0131335 | A1* | 6/2011 | Spaltro | G06F 9/5072 709/228 |
| 2011/0145795 | A1* | 6/2011 | Khanapurkar | G06F 11/3466 717/126 |
| 2011/0225277 | A1* | 9/2011 | Freimuth | G06F 9/45558 709/223 |
| 2012/0102199 | A1* | 4/2012 | Hopmann | G06F 9/505 709/226 |
| 2012/0173708 | A1* | 7/2012 | Bartfai-Walcott | G06F 9/5088 709/224 |
| 2012/0284067 | A1* | 11/2012 | Labat | G06Q 30/0283 705/7.11 |
| 2013/0117157 | A1 | 5/2013 | Iyoob et al. | |
| 2013/0312006 | A1* | 11/2013 | Hardman | G06F 9/5027 718/105 |
| 2014/0047342 | A1* | 2/2014 | Breternitz | G06F 9/5061 715/735 |
| 2017/0270449 | A1* | 9/2017 | Shrimali | G06F 8/00 |
| 2018/0205595 | A1* | 7/2018 | Abbondanzio | H04L 41/0816 |
| 2019/0098073 | A1* | 3/2019 | Modai | G06F 8/60 |

OTHER PUBLICATIONS

Wagle et al., "Cloud Service Providers Ranking Based on Service Delivery and Consumer Experience", 2015 IEEE 4th International Conference on Cloud Networking (CloudNet), Oct. 5-7, 2015, Niagara Falls, ON, Canada, 4 pages, <https://orbilu.uni.lu/bitstream/10993/24794/1/cloudnet2015.pdf>.

N et al., "QoS based Cloud Service Provider Selection Framework", International Science Congress Association, Research Journal of Recent Sciences, vol. 3 (IVC-2014), 7-12(2014), Aug. 2014, 6 pages, <:https://pdfs.semanticscholar.org/3089/3be2836860de27fdf3d30546209da39ed039.pdf>.

Mell et al., "The NISTS Definition of Cloud Computing", Recommendations of the National Institute of Standards and Technology, Special Publication 800-145, Sep. 2011, 7 pages.

Bohn et al., "NIST Cloud Computing Reference Architecture", 2011 IEEE World Congress on Services, NIST Special Publication, vol. 500, No. 2011, 3 pages.

"Cloud Harmony—Transparency for the Cloud." Gartner, Inc. [Online]. Available: https://cloudharmony.com.

Nagan et al., "Towards a Common Benchmark Framework for Cloud Brokers", 2012 IEEE 18th International Conference on Parallel and Distributed Systems (ICPADS), Dec. 17-19, 2012, Singapore, pp. 750-754.

Tiwari et al., "An optimized scheduling algorithm for cloud broker using adaptive cost model", 2013 3rd IEEE International Advance Computing Conference (IACC), Feb. 22-23, 2013, Ghaziabad, India, pp. 28-33.

Anastasi et al., "QBROKAGE: A Genetic Approach for QoS Cloud Brokering", 2014 IEEE International Conference on Cloud Computing (CLOUD), Jun. 27-Jul. 2, 2014, Anchorage, Alaska, pp. 304-311.

Kessaci et al., "A pareto-based genetic algorithm for optimized assignment of vm requests on a cloud brokering environment", 2013 IEEE Congress on Evolutionary Computation, Jun. 20-23, Cancun, Mexico, pp. 2496-2503.

Srivastava et al., "Optimal Adaptive CSP Scheduling on basis of Priority of specific service using Cloud Broker", 2014 9th International Conference on Industrial and Information Systems (ICIIS), Dec. 15-17, 2014, India, pp. 1-6.

Wang et al., "Dynamic Cloud Instance Acquisition via IaaS Cloud Brokerage", IEEE Transactions on Parallel and Distributed Systems, vol. 26, No. 6, Jun. 2015, pp. 1580-1593.

Liu et al., "Dynamic Resource Reservation via Broker Federation in Cloud Service: A Fine-grained Heuristic-Based Approach", 2014 IEEE Global Communications Conference, Exhibition & Industry Forum (GLOBECOM), Dec. 8-12, 2014, Austin, Texas, pp. 2338-2343.

Nesmachnow et al., "Efficient heuristics for profit optimization of virtual cloud brokers", IEEE Computational Intelligence Magazine, Feb. 2015, vol. 10, Issue 1, pp. 33-43.

Vieira et al., "A Scheduling Strategy Based on Redundancy of Service Requests on IaaS Providers", 2015 23rd Euromicro International Conference on Parallel, Distributed, and Network-Based Processing, Mar. 4-6, 2015, Turku, Finland, pp. 497-504.

Pawluk et al., "Introducing STRATOS: A Cloud Broker Service", 2012 IEEE Fifth International Conference on Cloud Computing (CLOUD) 2012, Jun. 24-29, 2012, Honolulu, Hawaii, USA, pp. 891-898.

Yangui et al., "Compatibleone: The open source cloud broker", Journal of Grid Computing vol. 12, Issue 1, Mar. 2014, pp. 93-109.

Grozev et al., "Inter-cloud architectures and application brokering: taxonomy and survey", Software: Practice and Experience, 2012, vol. 44, No. 3, pp. 369-390.

"Amazon EC2 Pricing." Amazon Web Services. [Online]. Available: https://aws.amazon.com/ec2/pricing/.

* cited by examiner

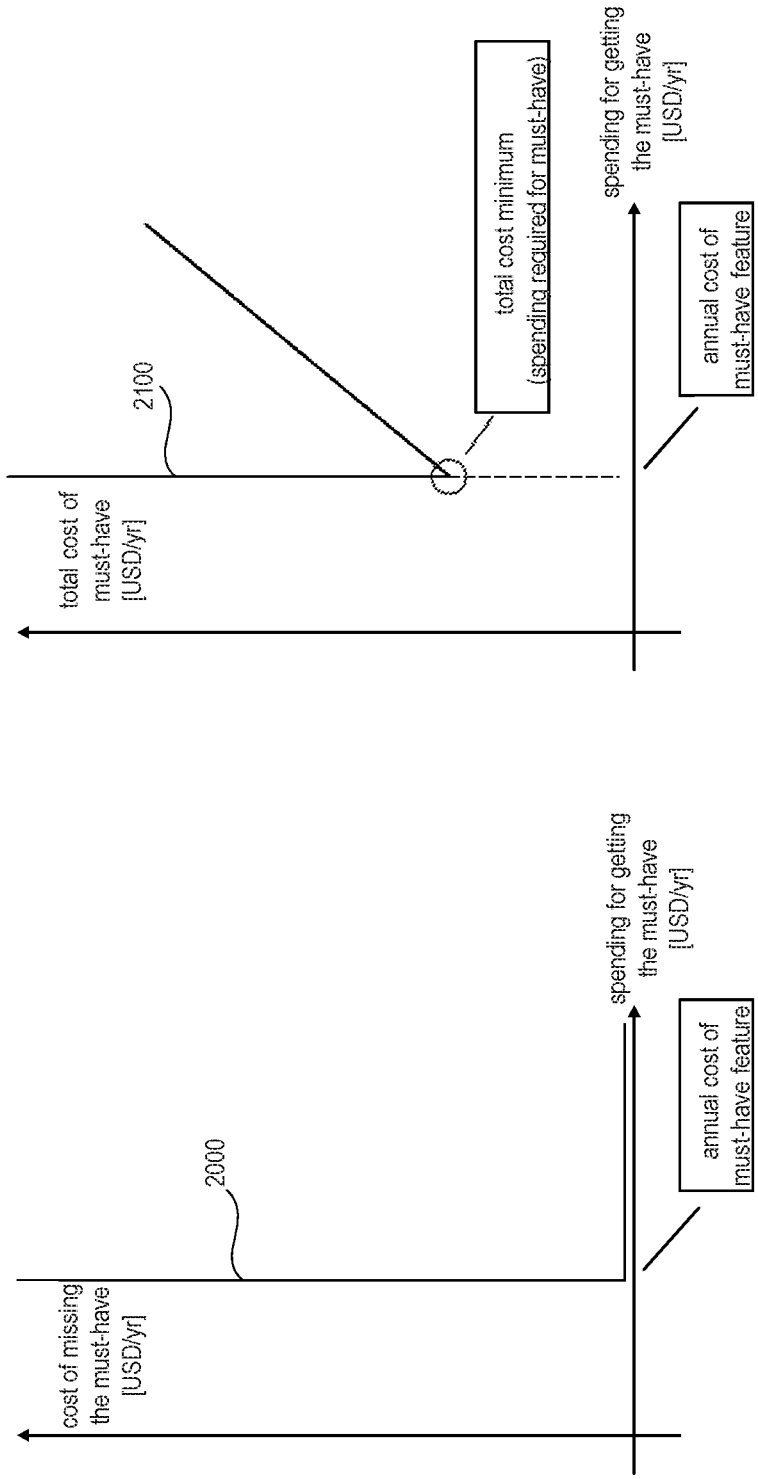

| feature/criterion | minimum total cost / year | spending required / year |
|---|---|---|
| fast response time | $900k | $850k |
| high availability | $1.7M | $1.5M |
| data encryption | $125k | $100k |
| data backup | $42k | $40k |
| disaster recovery | $2.4M | $2.3M |
| TOTAL | $5.167M | $4.790M |

Fig. 22

WORKLOAD EXECUTION IN A DISTRIBUTED COMPUTING INFRASTRUCTURE ON CANDIDATE NODES IDENTIFIED THROUGH PLURAL TEST DEPLOYMENTS

BACKGROUND

The present invention relates to execution of a workload in a distributed computing infrastructure, and in particular to cloud service arbitration.

Cloud brokers are entities that manage the use, performance and delivery of cloud services and negotiate the relationships between cloud providers and cloud consumers.

SUMMARY

According to an aspect of the present invention, there is a method, computer program product and/or system for executing a job workload in a distributed computing infrastructure, the job workload having assigned an execution requirement to be observed during the execution, the execution requirement being related to a computing resource, the infrastructure comprising a broker node, two or more work nodes and a network communicatively interfacing each of the broker node and the work nodes, the method, computer program product and/or system that utilizing a test deployment that performs the following operations (not necessarily in the following order): (i) receiving a test workload, the test workload having assigned the execution requirement, and a specification of a test node out of the work nodes; (ii) providing the test workload to the test node; (iii) causing the test node to execute the test workload and observe the execution requirement during the execution of the test workload; (iv) causing the test node to vary a status of the computing resource of the test node, execute the test workload using the varied resource and observe the execution requirement during the execution of the test workload using the varied resource; and (v) in response to each execution of the test workload by the test node, receiving a metric, the metric quantifying a response of the test node to the status of the computing resource during the execution.

According to a further aspect of the present invention, there is a method, computer program product and/or system for executing a job workload in a distributed computing infrastructure, the job workload having assigned an execution requirement to be observed during the execution, the execution requirement being related to a computing resource, the infrastructure comprising a broker node, two or more work nodes and a network communicatively interfacing each of the broker node and the work nodes, the method, computer program product and/or system that utilizing a broker node that performs the following operations (not necessarily in the following order): (i) creating a measuring workload, the measuring workload having assigned the execution requirement; (ii) selecting a first and a second candidate node out of the work nodes; (iii) performing the test deployment with the test workload being the measuring workload, the test node being the first candidate node, and the metric being a first metric; (iv) performing the test deployment with the test workload being the measuring workload, the test node being the second candidate node, and the metric being a second metric; (v) determining a cost impact function of the metric; (vi) determining a first total cost function from the first metric and the cost impact function, and determining a second total cost function from the second metric and the cost impact function; (vii) determining a first minimum of the first total cost function and a second minimum of the second total cost function; (viii) based on the first minimum and the second minimum, selecting one of the first candidate node and the second candidate node as an executing node for executing the job workload; and (ix) causing the executing node to execute the job workload.

According to a further aspect of the present invention, there is a method, computer program product and/or system for executing a job workload in a distributed computing infrastructure, the job workload having assigned an execution requirement to be observed during the execution, the execution requirement being related to a computing resource, the infrastructure comprising a broker node, two or more work nodes and a network communicatively interfacing each of the broker node and the work nodes, the method, computer program product and/or system that performs the following operations (not necessarily in the following order): (i) during the execution of the job workload, repeating the test deployment with the test workload being the measuring workload, the test node being the first candidate node, and the metric being an updated first metric; (ii) the execution requirement comprises two or more binary security and/or compliance conditions, the selection of the executing node comprising determining a compliance counter for each of the first and the second candidate node, the compliance counter for a given candidate node comprising a quantity of the security and/or compliance conditions which can be fulfilled by the given candidate node, the selection of the executing node further comprising selecting the given candidate node if its compliance counter is largest and the respective first or second minimum for the given candidate node is less than or equal to a predefined total cost threshold value; (iii) receiving failure notifications related to the executing node, determining a first correlation metric from the failure notifications received within a predetermined time window, and in case the first correlation metric lies within a predetermined first correlation range, determining out of the two or more work nodes a first group of safe work nodes from which no correlated failure notification was received, selecting a first safe executing node from the first group of safe work nodes, and relocating the job workload to the first safe executing node; and (iv) receiving a hazard forecast, determining a second correlation metric between the hazard forecast and each of the work nodes, and in case the second correlation metric between the hazard forecast and the executing node lies within a predetermined second correlation range, determining out of the two or more work nodes a second group of safe work nodes for which the second correlation metric lies out of the second correlation range, selecting a second safe executing node from the group of safe work nodes, and relocating the job workload to the second safe work node.

Embodiments of the invention are given in the dependent claims. Embodiments of the present invention can be freely combined with each other if they are not mutually exclusive.

BRIEF DESCRIPTION OF THE SEVERAL VIEWS OF THE DRAWINGS

In the following, embodiments of the invention are explained in greater detail, by way of example only, making reference to the drawings in which:

FIG. 20 depicts a plot of a curve representing a combination of a metric with a cost impact function for a required computing resource;

FIG. 21 depicts a plot of a curve representing a total cost function for a required computing resource;

FIG. 22 depicts a table for aggregating cost minima for multiple execution requirements;

DETAILED DESCRIPTION

Figure 1:
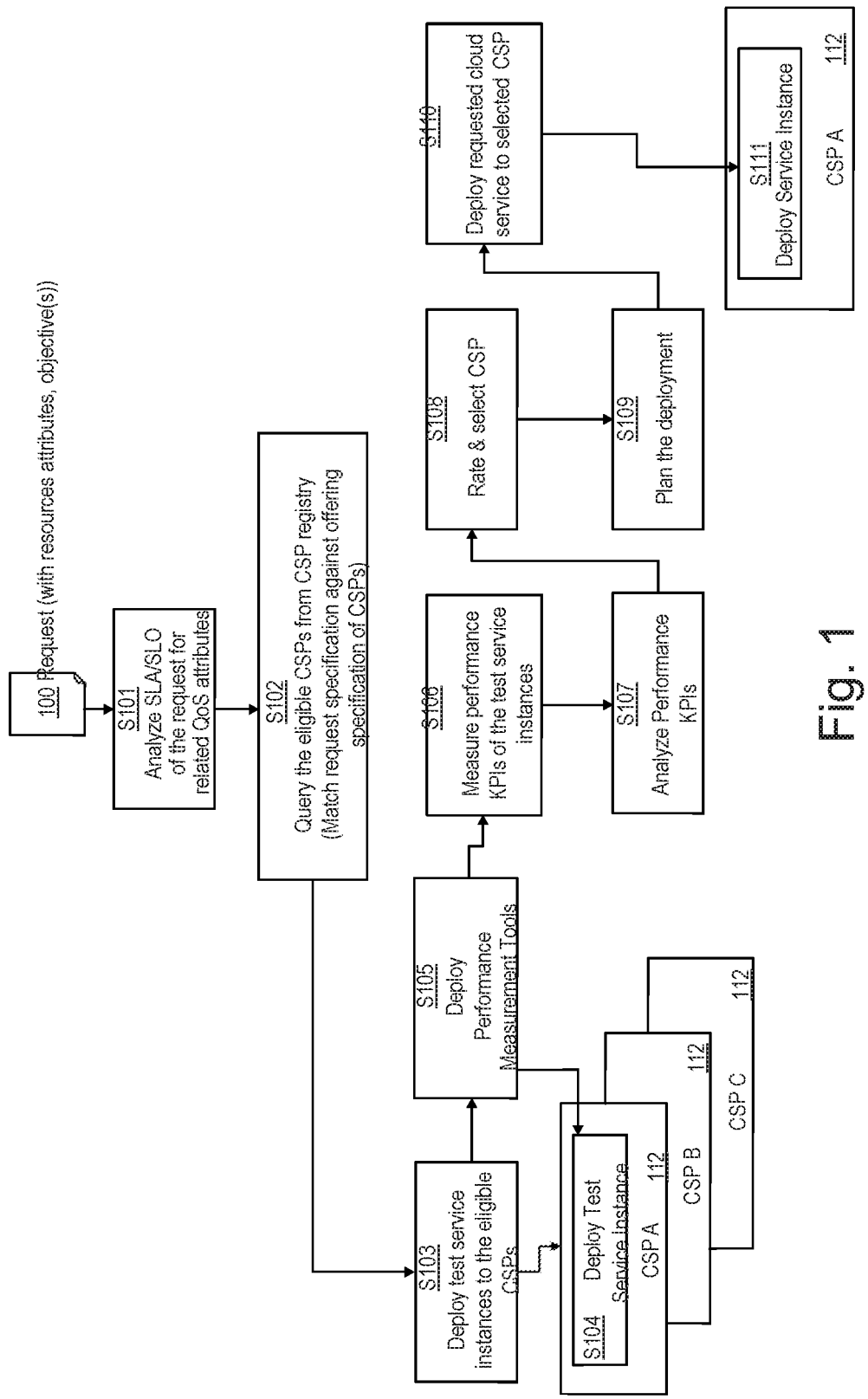
FIG. 1 depicts an overall process for distributed execution of a service instance.

Collection and comparison of quality of service (QoS) characteristics is considered a complex task which must be conducted by a human operator in order to respond to QoS changes. For this reason, present-day cloud service broker engines are typically unaware of temporal changes, before as well as during deployment of a service instance, in QoS characteristics, including without limitation characteristics of performance, compliance, security, and hazard risk. Therefore it is desirable to have a means which simplifies comparison of QoS characteristics to allow for a more up-to-date and fact-based cloud service broker operation.

The present invention proposes a new approach to service arbitration and workload relocation by cloud brokers. Categories of services provided by cloud brokers may include:

(i) service aggregation integrates multiple cloud services from multiple service providers into one or more new services which are provided to the consumer from a single management interface and with a common customer experience;

(ii) service arbitration combines cloud services from multiple cloud service providers (CSPs), but the services being aggregated are not fixed—instead, the cloud broker aggregates the services based on their rating for a given use case; and (iii) for service intermediation, the cloud broker enhances a specific service with value-add services and enables it for distribution to multiple cloud consumers.

The use of arbitration engines enables cloud service brokers (CSBs) to automatically determine the best CSP and service for any given customer order. The attributes considered in the optimization process vary depending on the proposed method. Typical attributes for rating infrastructure-as-a-service (IaaS) providers are the supported operating systems and configurations, geographical location, costs and rates, bandwidth and performance, SLA terms, legalization and security, compliance and audit.

A comprehensive model of a cloud broker architecture is described in J. Bond: "The Enterprise Cloud: Best Practices for Transforming Legacy IT", O'Reilly Media, Inc., 2015. The layered model distinguishes between the functions of the Cloud Broker Portal, the Cloud Broker Operations and Management, consisting of Orchestration and System Management, and the multiple CSPs. The centralized programming logic of the orchestration layer determines the CSP to be used for a given order from the service catalog. The service selection can be implemented based on customer preferences, based on intentionally hard-coded entries of a specific service provider in the service definition or dynamically through service arbitration by an arbitration engine.

Recent research about cloud brokers has a significant focus on service arbitration across numerous CSPs, in particular on optimizing the allocation of resources from different IaaS providers. A focus of the current research for cloud brokers is related to the selection of a CSP for the placement of virtual machines (VMs). Different methods are proposed to be used by CSBs for rating IaaS providers, e.g., genetics algorithms and rough sets. Multiple projects propose CSBs which take advantage of the different price options such as for on-demand, reservation and spot instances. There are a couple of academic and open-source implementations of CSBs, e.g., STRATOS, QBROKAGE and CompatibleOne.

For the scope of the present disclosure, a workload is understood as a computer-executable process. A node may be any computer, as defined further below, in a communications network capable of receiving a workload via the network, executing the workload, and returning a metric and optionally a result of the execution via the network. A computing resource is understood as any hardware or software setting of a node which can be configured via the network or by a workload supplied via the network so as to assess the feedback of such configuration on the execution of a workload. Preferably, the measuring workload exhibits a substantially smaller consumption of computing resources (e.g. memory and/or CPU utilization) than the job workload in order to minimize the effect of the test deployment on the resulting metric.

For reasons of simplicity, the present disclosure discusses cost measures in monetary units. It is emphasized however that the invention can be applied to an arbitrary continuous measure, including non-monetary units. Likewise, the term "cost" is not to be understood as solely referring to a monetary representation of computing resources and/or QoS characteristics, but rather to any auxiliary quantity which is generic with respect to the QoS characteristics of interest and to which an arbitrary measured QoS characteristic (i.e., the metric) can be mapped unambiguously.

A metric is understood herein as any measurable quantity which is related to the execution of a workload by a specific work node and can be assigned to a cost measure as defined above. For instance, a response time of a particular server as a function of annual infrastructure spending for using that server is a metric. The metric can be used at least at the tested sampling points. The metric can alternatively be converted into a continuous function by interpolation, e.g. by default or only in case the number of sampling points is below a threshold value, or the distance between subsequent sampling points is above a threshold value. An interpolation may include all measured points of the metric (e.g. using a spline function), or it may minimize the distance to the measured points (e.g. using a least-square fit).

The measuring workload may be a standardized workload dedicatedly generated for measuring a metric for a specific type of computing resource, and/or be derived from the job workload in order to reflect the resource consumption conditions of the actual job workload.

For the sake of further simplification, the present disclosure may consider different work nodes as being operated by different cloud service providers (CSPs). However, it is emphasized that this does not necessarily have to be the case as the same CSP may operate multiple nodes of different hardware and/or deployed at different geographical locations to which different regulations may apply.

A cost impact function is understood as yielding an effect, expressed in terms of the cost measure, as a function of the varied computing resource. Using the example of monetary units, the annual cost of reduced business or revenue impact of the operator of the broker node as a function of an average response time may be a valid cost impact function. An increased response time of a given work node would render the work node in question less attractive and thus yield a higher cost of lost business to the cloud service broker (CSB) operator. The cost impact function is considered to be independent of the work node and may be determined automatically using a method known as "A/B testing": randomly selected subsets of workload executions are run with different metrics in effect for each subset, for example, by deliberately varying system response times; a mapping from metric value to cost is obtained by measuring the cost impact for each subset, for example, variations of an average purchasing volume; a continuous cost impact function can be obtained by interpolating between the data points obtained from these samples.

The method for executing a job workload in a distributed computing infrastructure may provide numerous advantages. The method may allow for making automatic arbitration decisions based on up-to-date metrics of the status of a work node rather than catalog information which may be outdated. Utilizing real-time measurements (i.e. performing the test deployments yielding the metrics), the method may account for changing behavior of a given work node in terms of QoS characteristics and therefore allow for reacting on such changes by redistributing and/or relocating workload. Then, the method may relate metrics, which may comprise diverse data of incommensurable data types, to a cost metric, which may neutralize such effects of incommensurability by introducing a consistent and objective standard of comparison. The invention assumes that such relation is always possible as the costs for varying the computing resources of the test nodes should be known to the operator of the broker node.

In particular, the method may allow for evaluating continuous characteristics (such as a response time) against binary characteristics (e.g. compliance to a particular standard is given or not given) or multiply stepwise characteristics (e.g. different performance traits provided under standard, gold and platinum subscriptions), which may be understood as concatenations of binary characteristics. The method may allow for automatic arbitration decisions based on aggregation of multiple total cost minima obtained by repetition for multiple execution requirements. The method may allow for setting a particular requirement aside if the total cost of subscription exceeds the expected costs of noncompliance. The method may allow for proactive or reactive workload relocation to an optimal replacement node in response to a predicted or ongoing hazard or disaster.

The proposed, generic method can be applied for different types of services and resources, such as virtual machines (VMs) from infrastructure as a service (IaaS) providers, and containers and applications deployed to platform as a service (PaaS) providers. For example, the performance of the VMs or bare-metal servers of the same flavor and size from different CSPs may be evaluated in real-time based on user-selected criteria (e.g. expressed in terms of input/output operations per second, IOPS) in the placement process of the CSB. The performance of the hosts for containers (e.g. Docker) at different CSPs may be measured and QoS can be judged in relation to the specific containers of the user. The same may apply to application deployments. The performance of the user's application deployed to different PaaS providers can be considered in the process of the CSP selection by the CSB.

The present method may be used for service arbitration by cloud brokers in a cloud computing environment to obtain the following advantages:

(i) The method can be applied generically to the selection of different types of CSPs, such as IaaS providers, platform-as-a-service (PaaS) providers (e.g. based on CloudFoundry) and Docker container service providers.

(ii) The method allows for an effective comparison of compute, storage and network performance characteristics of cloud service instances (SIs) from different CSPs before making the actual selection of the CSP and cloud service to be offered to a user in response to a request.

(iii) The method may determine and provide data for cloud services instances of a specific type, beyond benchmarks and compute, storage and network metrics typically provided by third-party services such as CloudHarmony which provide only aggregated views per CSP.

(iv) The method may allow for monitoring CSPs for changes in their quality-of-service (QoS) characteristics, so that running workloads may benefit from improved performance attributes after the initial service selection and deployment by the CSB is completed.

(v) The method may enable migration of workloads from one CSP to another in case a cloud service with better QoS and/or cost characteristics is found for an already running workload. The method may automatically initiate a workload relocation when the QoS and/or cost characteristics of a current CSP do not meet the requirements of the original request to the CSB anymore.

(vi) Likewise, the method may allow for correcting an earlier CSP selection when security and/or compliance deviations of the CSP are detected. The method may enable integration with market monitoring for CSPs in order to allow running workloads to benefit from e.g. improved security and compliance characteristics or pricing of other CSPs after the initial service selection and deployment by the CSB is completed. The method may enable migration of workloads from one CSP to another in case a cloud service with better security and compliance and/or compliance characteristics is found for an already running workload.

(vii) The method may further allow for automatically evacuating workload from a CSP to another one after the initial placement in case of an arising or on-going hazard or in the event of a disaster. The method may allow integration with weather forecast, hazard alarm systems and location-based safety recommender systems in order to initially place workload in a safe location and to relocate the workload in case of a hazard or in the event of a disaster.

(viii) The method may allow for recovering a workload based on the original request in case a disaster impacted or destroyed the current instances of the requested services.

The selection of cloud service providers traces back to the need for multi-criteria decision making in comparing offerings and performance of different CSPs. This requires comparing criteria which are typically measured on different and incompatible scales having different dimensions. In some embodiments of the present invention, a solution is based on the Analytic Hierarchy Process (AHP). This approach uses a pairwise comparison of alternatives using manual processing and evaluation; a re-evaluation when CSPs change their QoS criteria, security features, compliance levels, pricing, etc.; and an attribution of a subjective score on a scale from 1 to 9 indicating relative importance or significance of criteria. By comparison, the present method may enable a dynamic, real-time CSP selection based on performance indicator measurements.

According to embodiments, the first total cost function comprises a sum of a first spending function for the computing resource of the first candidate node and a combination function of the first metric with the cost impact function, the second total cost function comprising a sum of a second spending function for the computing resource of the second candidate node and a combination function of the second metric with the cost impact function.

A spending function is defined herein as the identity function of the cost measure on which the metric is based. This may ensure that the total cost function possesses a minimum.

According to embodiments, in case the execution requirement comprises a continuously variable criterion, the determination of the first total cost function comprises determining a first continuous metric interpolating the first metric and determining the first total cost function from the first continuous metric and the cost impact function, and the determination of the second total cost function comprises determining a second continuous metric interpolating the second metric and determining the second total cost function from the second continuous metric and the cost impact function.

This may reduce the number of sample points, i.e. variations of the computing resource, which have to be taken to obtain a good approximation to the functional dependency of the metric on the computing resource. Thus, the arbitration decision may be accelerated.

According to embodiments, in case the execution requirement comprises a binary condition, the cost impact function comprises a compliance constant representing the case that the binary condition is observed and a noncompliance constant representing the case that the binary condition is not observed.

A conditional definition of the cost impact function may allow for using the test deployment also for assessing non-continuous execution requirements. As an example, a compliance or security condition contained in the execution requirement may be fulfilled or not fulfilled. The concept may be extended to multi-step conditions, e.g. for "basic", "advanced" and "professional" service characteristics, which can be understood as combinations (concatenations) of multiple binary sub-conditions. As a result, the combination function of the metric and the cost impact function (subsequently called "the combination function") may assume the shape of a (multi-) step function.

According to embodiments, in case the binary condition is compulsory, the compliance constant is set to a finite value and the noncompliance constant is set to a value representing positive infinity. This may ensure that the compulsory condition is always fulfilled as the noncompliance constant is assumed to exceed any further cost value in subsequent calculations. The corresponding combination function may thus assume a "hard-sphere" or "hard-wall" shape and the corresponding total cost function may have (in case it comprises a spending function as a summand) a minimum at the spending cost of the compulsory feature.

According to embodiments, in case the execution requirement further comprises a continuously variable criterion, the first and second total cost functions are respectively determined as first and second compliant total cost functions for the case that the binary condition is observed and as first and second noncompliant total cost functions for the case that the binary condition is not observed, the first minimum and the second minimum being respectively determined as first and second compliant minima of the first and second compliant total cost functions and as first and second noncompliant minima of the first and second noncompliant total cost functions, the selection of the executing node being based on the first and second compliant minima and the first and second noncompliant minima.

This may enable and facilitate the determination of the total cost minima even if the requirements contain a combination of a binary and a continuously variable criterion. The metrics are evaluated so as if the compliant test node and the noncompliant test node were two different test nodes.

According to embodiments, the execution requirement is taken from a group of execution requirements, each execution requirement being related to a computing resource, the method further comprising repeating, for each execution requirement in the group of execution requirements, the creation of the measuring workload, the performance of the test deployment with the test node being the first candidate node, the performance of the test deployment with the test node being the second candidate node, the determination of the cost impact function, the determination of the first and second total cost functions, and the determination of the first and second minima, the method further comprising, for at least part of the execution requirements in the group, aggregating the respective first minima to a first aggregate minimum and aggregating the respective second minima to a second aggregate minimum, the selection of the executing node being based on the first aggregate minimum and the second aggregate minimum.

This may facilitate the determination of the executing node by evaluating a total effect of all requirements, hence a weighting or otherwise post-processing of the cost effect of each requirement may be unnecessary, and execution requirements based on incommensurable metrics may be combined.

According to an embodiment, the method further comprises, during the execution of the job workload, repeating the test deployment with the test workload being the measuring workload, the test node being the first candidate node, and the metric being an updated first metric.

This may allow for monitoring the execution and deciding on an adequate response to a change in case changing QoS characteristics, e.g. by relocation to a more suitable work node.

According to embodiments, the method further comprises: (i) repeating, during the execution of the job workload, the test deployment with the test workload being the measuring workload, the test node being the second candidate node, and the metric being an updated second metric; (ii) determining an updated first total cost function from the updated first metric and the cost impact function, and determining an updated second total cost function from the updated second metric and the cost impact function; (iii) determining an updated first minimum of the updated first total cost function and an updated second minimum of the updated second total cost function; (iv) based on the updated first minimum and the updated second minimum, selecting one of the first candidate node and the second candidate node as an updated executing node for executing the job workload; and (v) in case the updated executing node differs from the executing node, relocating the job workload to the updated executing node.

A present embodiment proposes a CSB which is able to select the service of a CSP which matches the security and compliance requirement of user request at the lowest total cost among all CSPs evaluated and can relocate the customer's workload to another CSP in case there is a security or compliance deviation or a security breach. Relocation of the customer's workload may be based on the results of further evaluation such as the compliance counter calculation disclosed herein.

A present embodiment proposes a generic method for workload relocation for use by cloud service brokers. Clients may wish to relocate their workloads to a different CSP or service in case this new CSP/service matches better the requirements of original service request or when there are changing QoS requirements for a workload due to e.g. higher demand. Workload relocation may move workload when it detects changes in the QoS attributes of services instances of the multiple CSPs (workload relocation). After a workload runs for a while on the CSP initially selected by the CSB, it may be found that other CSPs provide now e.g. better QoS characteristics, the workload running on the current CSP experiences QoS deviations or a better cost structure is offered by another CSP to serve the workload.

With the proposed new method, a CSB may be enabled to react to QoS deviations by the current CSP. When a QoS deviation is detected e.g. by the performance management of the CSB, the CSB may employ the methods of the real-time QoS-aware arbitration engine in order to identify a new CSP and service for the workload. In case a better CSP and service is found, the CSB may trigger the relocation of the workload.

The same process may be initiated in case a client has changes in the QoS requirements of a workload (compared to the original request submitted to the CSB). In order to determine if other CSPs provide an improved QoS characteristic and if one is now better suited to run a given workload, the CSB may deploy of the originally requested service in regular intervals to different CSPs. If there is a CSP/service with better QoS characteristics, the CSB may invoke the relocation optimization which determines if a relocation provides the desired benefits in correlation to other objectives specified in the original request.

In case there are changes in the price model or prices of the CSPs, the relocation deployment may be triggered by the CSB to evaluate if the CSP/service with the better price still provides the QoS level of the request. If a relocation to another CSP/service delivers a reasonable benefit for the client, the CSB may initiate the relocation process.

The proposed method for workload relocation may also be applied to a security- and compliance-aware CSB and to a disaster aware CSB as disclosed herein. After the initial placement by the CSB, it may be found after a while that other CSPs provide now e.g. better security and compliance structure to serve the workload. The security- and compliance-aware CSB may detect such scenarios and migrate the workload to a CSP which meets the workload's security and compliance requirements better. The disaster-aware CSB may be enabled to handle disasters impacting cloud service providers (CSP). Natural and/or human hazards can impact the availability of the services provided by a CSP and imply a severe outage for a customer using these services. The disaster-aware CSB may proactively or reactively relocate the workload to another CSP by analyzing arising or on-going hazards in the geographical location the data centers of the CSP.

According to embodiments, the determination of the first and second total cost functions, the determination of the updated first and second minima and the selection of the updated executing node are performed only in case that at least one of the following is true: the updated first metric differs from the first metric; the updated second metric differs from the second metric; the cost impact function differs from the cost impact function used during the determination of the first and second total cost functions; and the execution requirement differs from the execution requirement used during the test deployment with the metric being the first or second metric. This may reduce the calculative effort of the broker node.

According to embodiments, the method further comprises querying an owner of the job workload for an approval for the relocation, the relocation being performed only in response to receiving the approval. This may reduce the amount of unnecessary or unwanted relocations, e.g. to ensure that decision policies can be applied which cannot be assessed using the test deployment.

According to embodiments, the infrastructure further comprises a load balancing node, the execution of the job workload by the executing node being performed as a former instance, the relocation comprising causing the executing node to provision a new instance of the job workload, causing the executing node to halt the execution of the previous instance, migrating one or more artifacts of the job workload from the executing node to the updated executing node, causing the updated executing node to register the new instance at the load balancing node, causing the updated executing node to execute the new instance, causing the load balancing node to deregister the former instance, and causing the executing node to destroy the former instance.

This may enable a faster and more flexible response to changing QoS conditions, in particular if the job workload has a long runtime. The workload may be resumed with the transferred artifacts conserving the present execution status instead of having to restart the whole deployment.

According to embodiments, the execution requirement comprises a compulsory condition, the selection of the first and the second candidate node further comprising preventing the selection of a given work node as the first or the second candidate in case the given work node is unsupportive of the compulsory condition. This may reduce the resource consumption for the whole arbitration process as the determination of the executing node can be skipped for any work nodes if they are known to be noncompliant to the compulsory condition.

According to an embodiment, the execution requirement comprises two or more binary security and/or compliance conditions, the selection of the executing node comprising determining a compliance counter for each of the first and the second candidate node, the compliance counter for a given candidate node comprising a quantity of the security and/or compliance conditions which can be fulfilled by the given candidate node, the selection of the executing node further comprising selecting the given candidate node if its compliance counter is largest and the respective first or second minimum for the given candidate node is less than or equal to a predefined total cost threshold value.

This may enrich the service arbitration engine of a CSB with a new method for real-time security and compliance-aware CSP rating, and hence provide the advantage of taking not only the cost functions into account for an arbitration decision, but rather use the results to more focused decisions based on optimum compliance and use the cost metrics only to ensure that the arbitration stays within a desired cost framework.

The new method for security- and compliance-aware CSP rating may provide and/or enable the following beneficial capabilities: CSP profiling with respect to specific security and compliance regulations on regular intervals; real-time security and compliance aware CSP and services selection for new requests by CSB user; evaluation of changes in the security and compliance regulations; evaluation of changes in the security and compliances services provided by the CSPs; evaluation of security breaches detected for a given CSP; and reacting to findings in audits initiated by the CSP customer.

The security requirements are typically documented in corporate security policies. Compliance requirements are typically defined for a given industry by standards or by legislation. These security and compliance standards may be regularly updated to align the technology development and to address new and changing risks and threats. The responsibility to adhere to security policies and compliance regulations is usually at the side of the CSP consumer. Nevertheless, today's CSPs often offer compliance enablement to customer given information security policies or to regulatory compliance laws such as PCI, HIPAA, European Data Privacy and others.

According to an embodiment, the method further comprises receiving failure notifications related to the executing node, determining a first correlation metric from the failure notifications received within a predetermined time window, and in case the first correlation metric lies within a predetermined first correlation range, determining out of the two or more work nodes a first group of safe work nodes from which no correlated failure notification was received, selecting a first safe executing node from the first group of safe work nodes, and relocating the job workload to the first safe executing node.

According to an embodiment, the method further comprises receiving a hazard forecast, determining a second correlation metric between the hazard forecast and each of the work nodes, and in case the second correlation metric between the hazard forecast and the executing node lies within a predetermined second correlation range, determining out of the two or more work nodes a second group of safe work nodes for which the second correlation metric lies out of the second correlation range, selecting a second safe executing node from the group of safe work nodes, and relocating the job workload to the second safe work node.

These embodiments may enhance the method towards a method for hazard-aware service arbitration for usage by cloud service brokers. Natural and manmade hazards affecting a CSP may cause severe impacts to a client's workload. In order to lower the risk of disaster-induced outages for clients, these embodiments propose to enable the CSB with awareness about arising or on-going hazards and the capability to detect the event of a disaster at the CSP's data center location.

With the proposed method, the CSB may be enabled to gather information about hazards from different sources such as weather forecasts, hazard alarm systems, earthquake warning systems, news feeds and location-based safety recommender systems. Based on the data center locations of the CSPs, the CSB may use the hazard information to assess the potential impact on the different sites of the CSPs and to create a hazard risk profile for each CSP including each of its data centers. Using the calculated likelihood that a disaster at a CSP's site will occur and the projected time until the potential disaster, the CSB may determine actions to proactively evacuate a client's workload by relocating it to another CSP. In case the CSB detects the event of a disaster in a site of a CSP based on the information from its own monitoring system and information from the sources mentioned above, the CSB may automatically trigger a recovery at another site of the same or another CSP.

According to embodiments, the selection of the first safe executing node comprises, for each safe work node in the first group of safe work nodes, performing the test deployment with the test workload being the measuring workload, the test node being the safe work node, and the metric being a third metric; determining a third total cost function from the third metric and the cost impact function; and determining a third minimum of the third total cost function, the selection of the first safe executing node further comprising selecting a given safe work node out of the first group of safe work nodes if its third minimum is smallest.

According to embodiments, the selection of the second safe executing node comprises, for each safe work node in the second group of safe work nodes, performing the test deployment with the test workload being the measuring workload, the test node being the safe work node, and the metric being a fourth metric; determining a fourth total cost function from the fourth metric and the cost impact function; and determining a fourth minimum of the fourth total cost function, the selection of the second safe executing node further comprising selecting a given safe work node out of the second group of safe work nodes if its fourth minimum is smallest.

These embodiments may ensure that the target node of proactive or reactive relocation optimally fulfills the execution requirement.

According to embodiments, the selection of the executing node comprises selecting the first candidate node in case the first minimum is less than or equal to the second minimum, and selecting the second candidate node in case the first minimum is greater than the second minimum. This may increase the efficiency of resource utilization for the execution of the job workload.

According to embodiments, the metric comprises one or more of the following: a processing time or rate of the execution of the test workload by the test node; a response time or rate of the test node during the execution of the test workload; an availability figure of the test node during the execution of the test workload; a service figure descriptive of a service level fulfilled by the test node during the execution of the test workload; a binary status of fulfillment of a security, compliance, or service condition by the test node during the execution of the test workload; a disaster recovery time or rate of the test node; and a price charged for a service used or implemented by the test node for the execution of the test workload.

These metrics may provide comprehensive and realistic measures with a high predictive potential about the behavior of a given test node in case the job workload is actually deployed to this node subsequently.

According to embodiments, the distributed computing infrastructure comprises a cloud computing environment, the execution of the job workload being provided as a service in the cloud computing environment, the method being implemented as a function of a management layer of the cloud computing environment. This may allow for taking into account current and actual quality-of-service (QoS) attributes of actual cloud service instances (SIs) of the multiple cloud service providers (CSPs) when selecting a specific CSP and cloud service in response to a request (initial placement). The new generic method may be used for improved initial placement and workload relocation decisions of cloud brokers by measuring a performance key performance indicator (KPI) of actual cloud service instances.

A present embodiment may improve the accuracy of the CSP rating by measuring and evaluating the KPIs of service instances of the actual cloud service to be finally deployed. A new real-time QoS-aware arbitration engine is introduced. The engine may be made aware of the QoS characteristics of the requested cloud service for each CSP in real-time. By using the proposed method, the actual cloud service may be deployed to the different CSPs to be considered and the cloud service instance specific performance KPIs of the test service instances running on those CSPs may be measured. The measurement of the performance KPIs can be achieved by gatherings metrics from tooling built into the service instances or by integrating with externally available performance measuring tooling. Besides other attributes, the KPIs of the actual service instances from the different CSPs may be used to determine the final CSP for cloud service deployment.

According to embodiments, the first and the second candidate node are operated by different service providers. Thus considering a particular candidate node of a given CSP as representative for all nodes operated by that CSP, this may further reduce resource consumption of the arbitration process.

FIG. 1 depicts an exemplary overall process for distributed execution of a service instance. A broker node receives a request 100 for executing a job workload together with execution requirements which may include resource attributes and/or service level objectives. In step S101 the broker analyzes the attributes and objectives for measurable QoS attributes. In step S102 the broker queries a set of eligible work nodes 112 (CSPs) from a CSP registry database, matching the request specifications against service specifications offered by the CSPs. In step S103 the broker generates the measuring workload for the requested workload and deploys (S104) it as a test workload to the eligible work nodes 112. In step S105 the broker deploys performance measurement tools for each test service instance. The broker then receives (S106) and analyzes (S107) the measured metrics (KPIs) of the test service instances. Based on the results of the analysis, the broker generates (S108) a rating of all candidate nodes 112 and selects (S108) the best-ranked node 112 (CSP) as the executing node 112. Eventually, the broker node plans (S109) and initializes the deployment (S110) of the requested cloud service (the job workload) to the selected CSP node 112 and causes (S111) the executing node 112 to execute the job workload.

Figure 2:
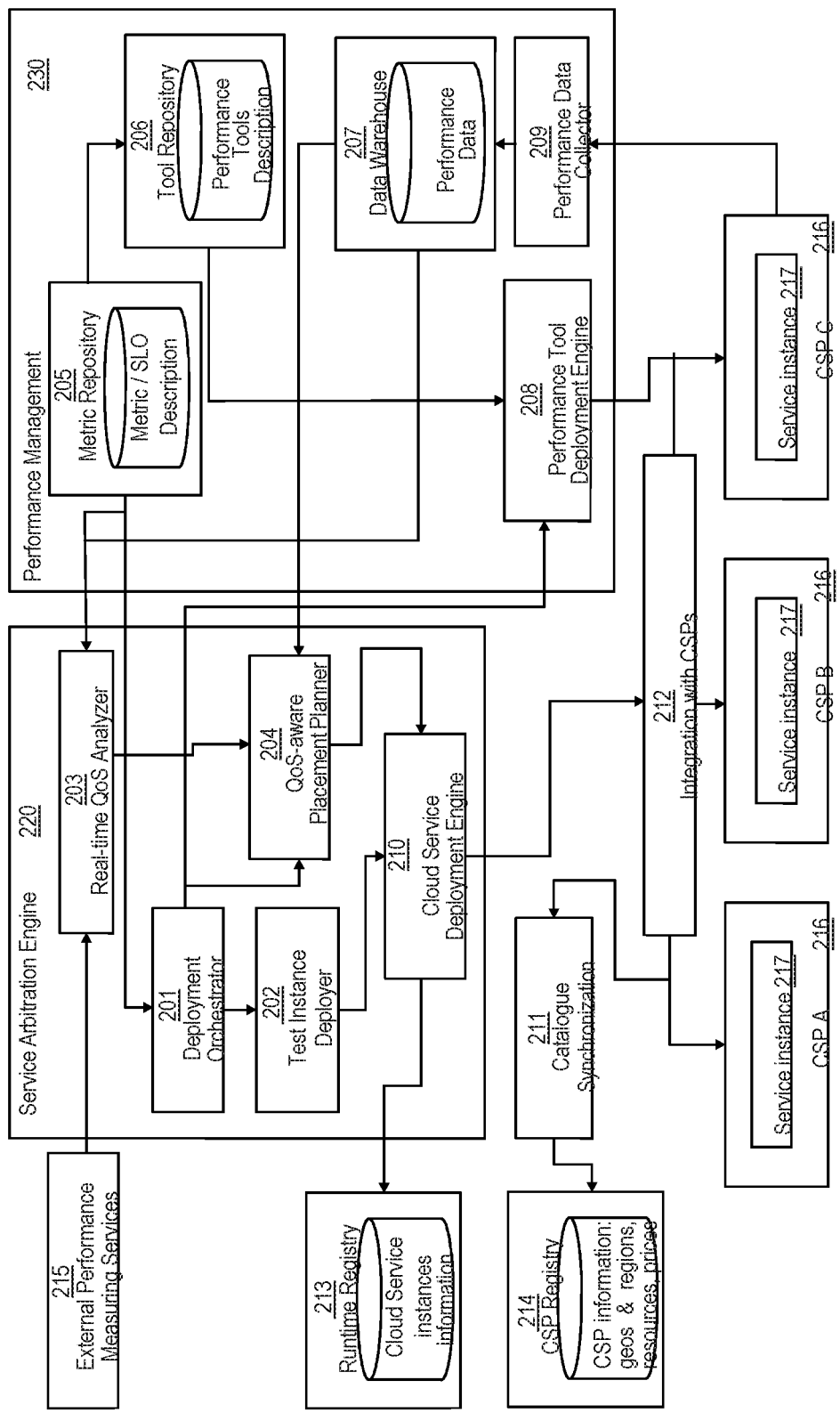
FIG. 2 depicts a component model of a service arbitration environment.

FIG. 2 depicts a component model of an exemplary service arbitration environment. A service arbitration engine 220 comprises a real-time QoS analyzer 203, a deployment orchestrator 201, a test instance deployer 202, a QoS-aware placement planner 204 and a cloud service deployment engine 210. The service arbitration engine collaborates with a performance management module 230 which comprises a metric repository 205, a tool repository 206, a data warehouse 207, a performance tool deployment engine 208 and a performance data collector 209.

The Deployment Orchestrator 201 orchestrates the steps to be performed by the Service Arbitration Engine. The Test Instance Deployer 202 deploys the test service instances of requested cloud service on the eligible CSPs. The Real-Time QoS Analyzer 203 analyzes the performance KPIs of test service instances and existing instances of the same type in relation to the QoS requirements of the requested service, and provides a metric function for each CSP and each of the KPIs. The QoS-aware Placement Planner 204 performs a rating of CSPs based on the data in the CSP registry 214 and the results of Performance Analyzer 203, and derives a placement decision, i.e. selects a CSP for the final deployment of the requested cloud service. A Metric Repository 205 provides information about the KPIs and metrics to be gathered for different type of resources and QoS requirements. The Tool Repository 206 provides information about the performance measurement tools to be used to gather specific KPIs and metrics. The Data Warehouse 207 is used to store data of the performance KPIs. The Performance Tool Deployment Engine 208 deploys the performance tools required to collect the performance KPIs of the service instances. The Performance Data Collector 209 gathers the data of performance KPIs and stores it into the Data Warehouse 207. The Cloud Service Deployment Engine 210 takes the placement decisions of the Deployment Planner 204 as input, and determines and executes the deployment steps.

Furthermore, a catalog Synchronization module 211 updates a CSP Registry 214 with the current service offering descriptions, attributes and prices from the CSPs. A module for integration with the CSPs 212 provides standardized APIs on the base of the CSP-specific APIs for integration with the CSPs. A Runtime Registry 213 holds information about existing cloud services instances, their location and attributes. A CSP Registry 214 provides information about the different CSPs, geographies, cloud service offerings, attributes and prices. External Performance Measurement Services 215 provide as external sources performance KPIs about the cloud service instances. Cloud Service Providers 216 offer and allow to order different types of cloud services. Service Instances 217 are instantiations of requested cloud services executed by the cloud service providers 216.

Figure 3:
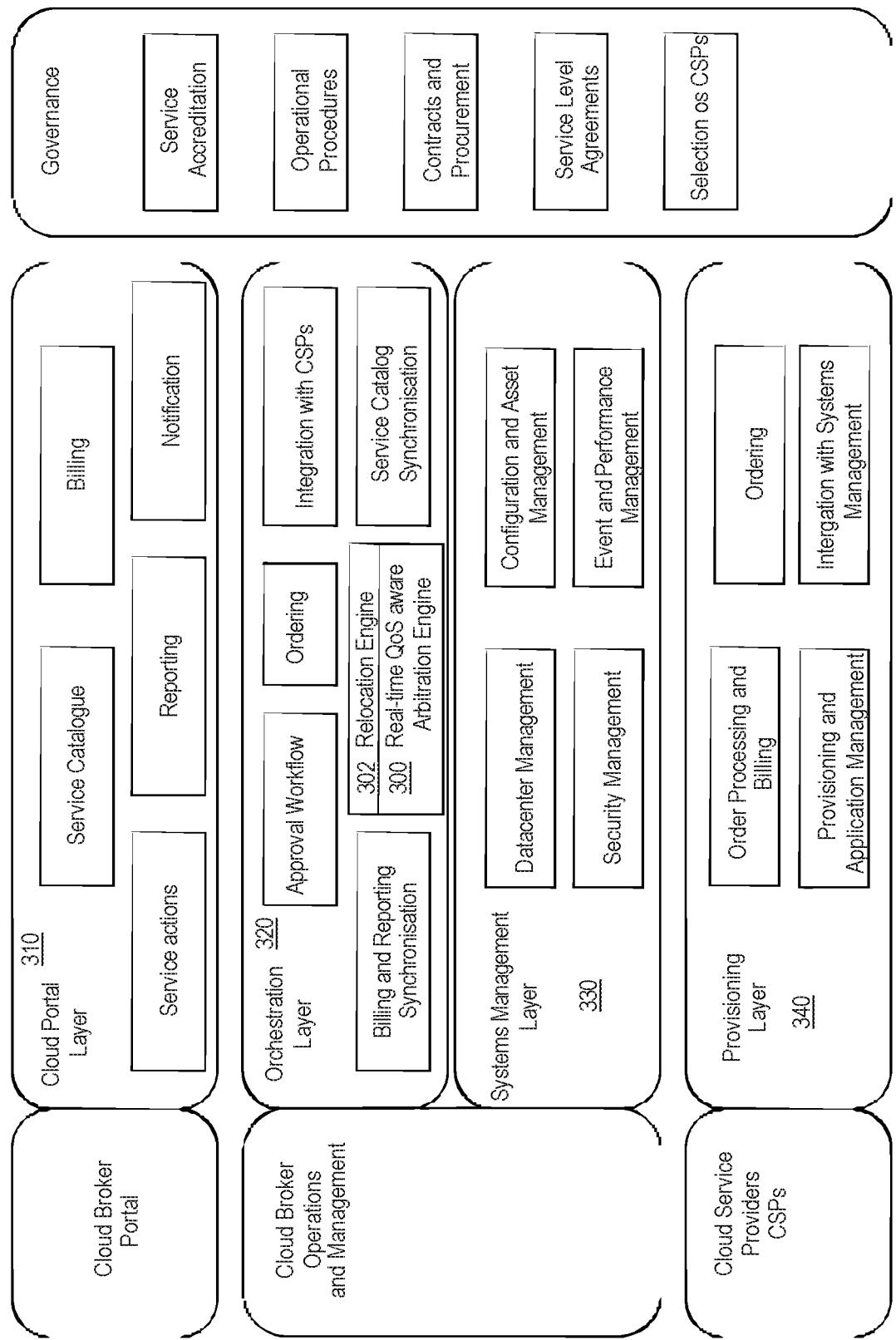
FIG. 3 depicts a layer model of a service arbitration environment.

FIG. 3 depicts an exemplary layer model of a service arbitration environment. A cloud broker portal uses functions of a cloud portal layer 310 which provides a service catalog, billing, service actions, reporting and notification. A cloud broker and operations management module uses functions of an orchestration layer 320 and a systems management layer 330. The orchestration layer 320 provides approval workflow, ordering, integration with CSPs, billing and reporting synchronization, service catalog synchronization, and a real-time QoS-aware arbitration engine 300 collaborating with an attached relocation engine 302. The systems management layer 330 provides datacenter management, security management, configuration and asset management, and event and performance management functions. Cloud service providers use functions of a provisioning layer 340 which provides order processing and billing, provisioning and application management, ordering and integration with systems management. Layer-independent governance functions include service accreditation, operational procedures, contracts and procurement, service level agreements, and selection of CSPs.

Figure 4:
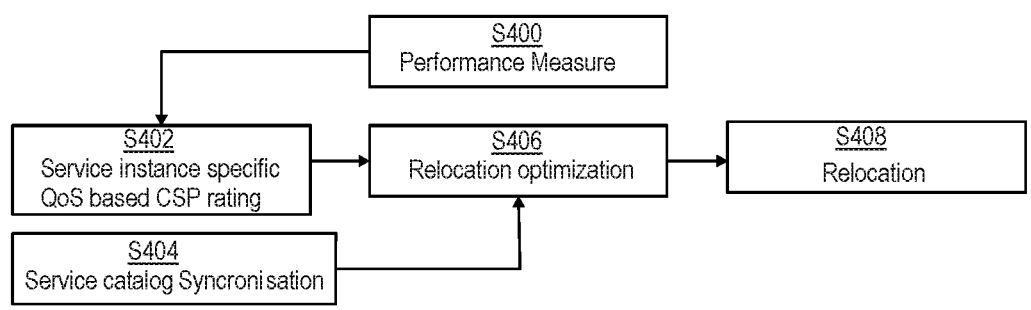
FIG. 4 depicts a flow diagram of an overall deployment process involving workload relocation.

FIG. 4 depicts a flow diagram of an exemplary overall deployment process involving workload relocation. Step S400 comprises a performance measurement: The CSB measures KPIs of a service instances and detects QoS deviations by comparison to the original request made for a service instance. Step S400 is followed by step S402. Step S402 comprises service instance-specific QoS-based CSP rating: In this process, the CSB deploys the originally requested service in regular intervals to different CSPs, measures the QoS performance attributes and terminates the instances again. Step S402 is followed by step S406. Step S404 comprises Service Catalog Synchronization, wherein the CSB stores information about the services provided by the CSPs, their price models and the actual prices into the CSP registry. Step S404 is followed by step S406. Step S406 comprises relocation optimization: Using the results of the QoS based CSP rating and the updates about the cost structure of a CSP, the CSB determines a best matching CSP and service to which a current workload can be relocated. In step S408 the workload is relocated from one CSP to another CSP in case that step S406 resulted in a positive decision for relocation.

Figure 5:
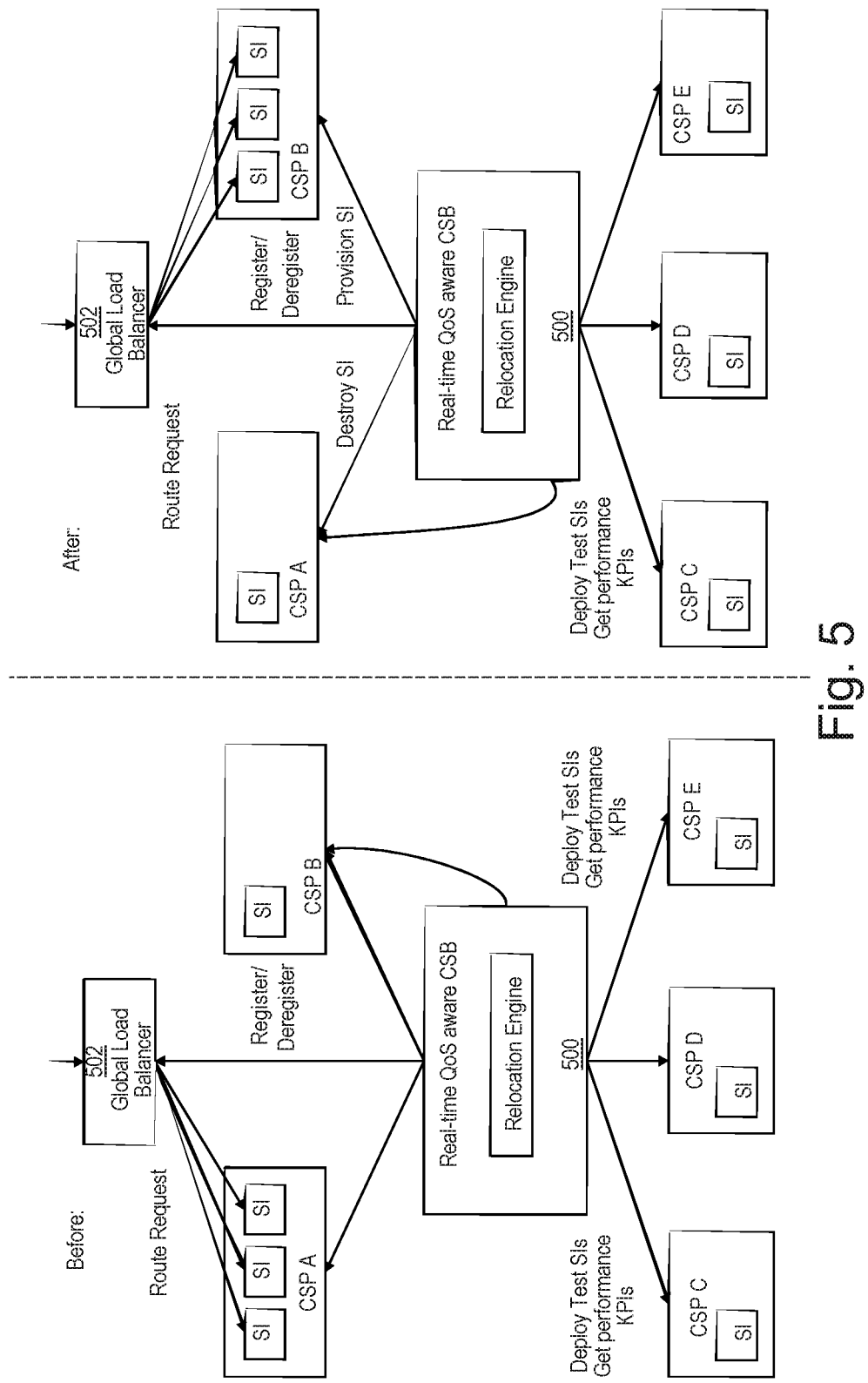
FIG. 5 depicts a component diagram illustrating effects of workload relocation.

FIG. 5 depicts a component diagram illustrating effects of an exemplary workload relocation. Both sides of the drawing show a real-time QoS-aware CSB 500 with relocation engine which is collaborating with a global load balancer 502 to register, deploy and deregister service instances SI to a set of CSP work nodes A to E. On the left-hand side the CSB 500 has determined that CSP A is an optimum choice for SI deployment and instructs the load balancer 502 to route requests comprising the respective execution requirement to CSP A. At the same time the CSB 500 conducts test deployments on CSPs B to E to monitor changes of the QoS characteristics of these CSP nodes. As the CSB 500 receives a change of the execution requirements for the running SIs, the CSB 500 determines that CSP B matches the changes requirements better and performs a relocation of the SIs running on CSP A to CSP B. The CSB 500 causes CSP B to provision new instances for the SIs of CSP A, halts the execution of the SIs on CSP A, migrates the SIs from CSP A to CSP B, instructs the global load balancer 502 to route further requests comprising the respective execution requirement of the migrated SIs to CSP B, causes CSP B to continue to process the migrated SIs in their respective new instances, causes CSP A to destroy the former instances of the migrated SIs, and conducts a test deployment on CSP A. The result of the migration is shown on the right-hand side of FIG. 5 where CSP B is executing the migrated SIs and CSP nodes A and C to E are executing their respective test deployments.

Figure 6B:
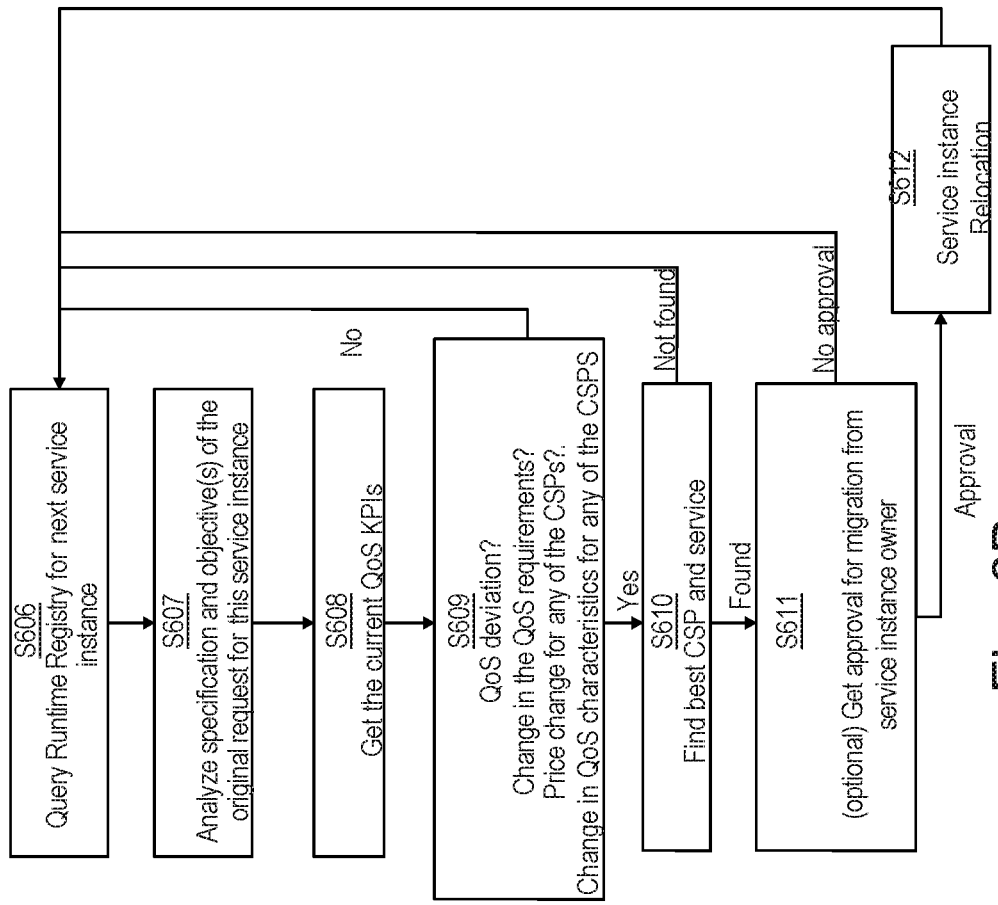
FIG. 6B depicts a flow diagram of a service instance deployment process involving workload relocation.
Figure 6A:
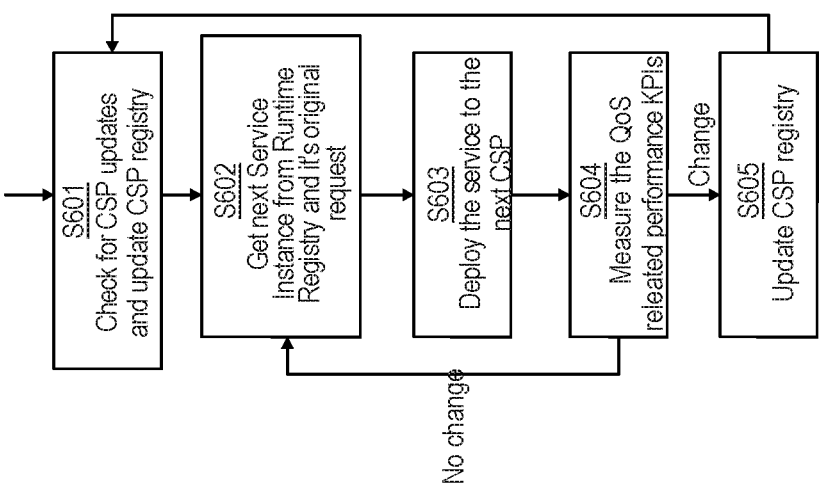
FIG. 6A depicts a flow diagram of a cloud service provider management process involving workload relocation.

FIG. 6A depicts a flow diagram of an exemplary cloud service provider management process involving workload relocation. In step S601 a performance management module checks a CSP registry for CSP updates and stores new CSP updates in a CSP registry. In step S602 the performance management module receives a next service instance and a corresponding request from a runtime registry. In step S603 the performance management module deploys the received service instance to the corresponding CSP node. In step S604 the performance management module measures QoS-related performance KPIs of the selected CSP node. In case the SI execution finds no changes to the KPIs, the performance management module branches back to step S602 to process a next SI. If a change is detected, the performance management module updates (S605) the CSP registry entry of the selected CSP node and branches back to step S601 for synchronization with the CSP registry.

FIG. 6B depicts a flow diagram of an exemplary service instance deployment process involving workload relocation. In step S606, a relocation engine queries the runtime registry for a next running service instance (SI). In step S607, the relocation engine analyzes the specifications and objectives of an original request for the inspected service instance. In step S608 the relocation engine receives QoS KPIs currently measured during the execution of the currently investigated workload. In step S609 the relocation engine determines whether there is a deviation in the QoS KPIs, a change in the QoS requirements, a price change for any of the CSPs, or a change in QoS characteristics for any of the CSPs. If no changes or deviations are found, the relocation engine branches back to step S606 to assess the next service instance. If a change or deviation is detected, the relocation engine determines (S610) a best matching CSP or work node for relocation of the present workload. If no better matching CSP work node can be determined, the relocation engine branches back to step S606 to assess the next SI. If a better matching work node is determined, the relocation engine optionally contacts (S611) an owner of the service instance about to be relocated for migration approval. If the owner does not approve the migration, the relocation engine branches back to step S606 to assess the next SI. If the relocation engine receives the owner's approval or if step S611 is left out, the relocation engine performs the relocation (S612) of the present SI to the determined new work node.

Figure 7:
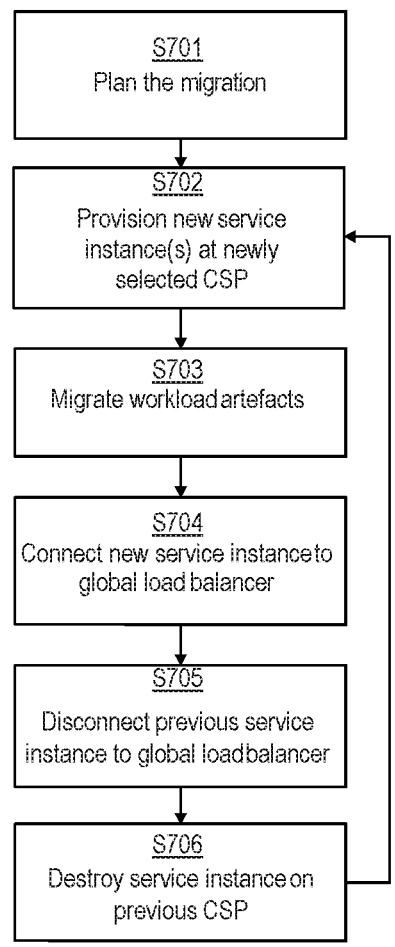
FIG. 7 depicts a flow diagram of a relocation step.

FIG. 7 depicts a flow diagram of an exemplary relocation step. In step S701 the relocation engine plans the migration. In step S702 the relocation engine causes the newly selected CSP to provision one or more new service instance(s) for the SIs to be migrated. In step S703 the relocation engine migrates the artifacts created by a first SI to be migrated. In step S704 the relocation engine connects the new first SI to a global load balancer. In step S705 the relocation engine disconnects the previous first SI from the global load balancer. In step S706 the relocation engine causes the previous CSP to destroy the previous first SI. The relocation engine then branches back to step S702 to continue with relocating any next SI.

Figure 8:
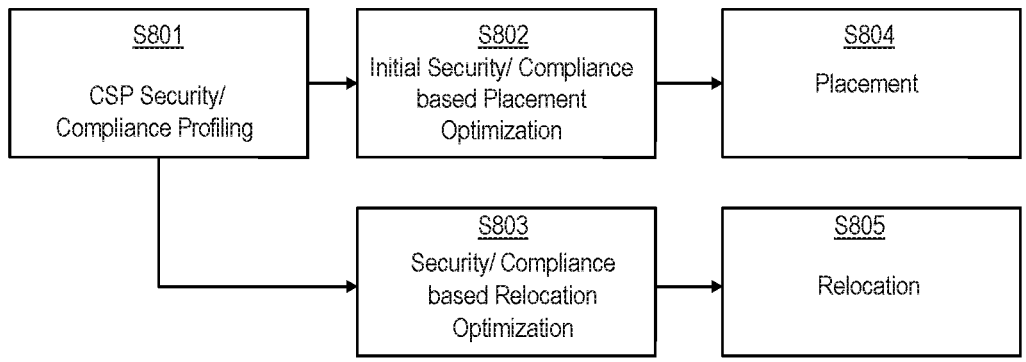
FIG. 8 depicts a flow diagram of an overall security- and compliance-aware deployment process.
Figure 9:
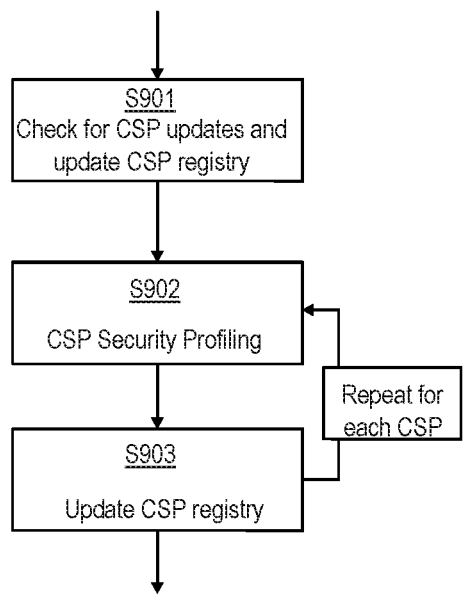
FIG. 9 depicts a flow diagram of a security- and compliance-aware cloud service provider management process.
Figure 10:
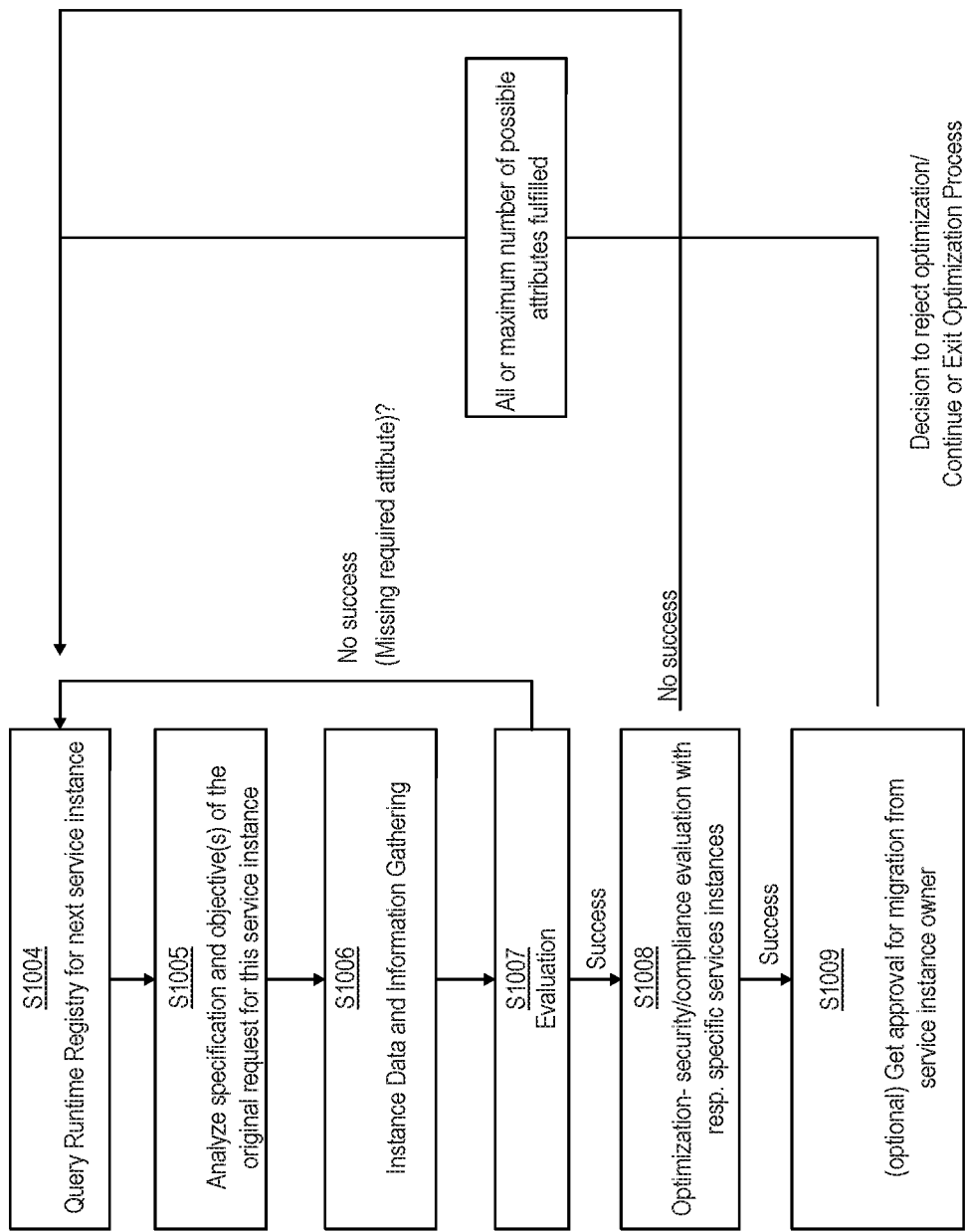
FIG. 10 depicts a flow diagram of a security- and compliance-aware service instance deployment process.

Turning now to FIGS. 8-10, exemplary approaches to security and/or compliance aware cloud service arbitration are discussed. The information security policy of a customer is typically given by a list of attributes (security requirements) defined in the chapters of the policy. Similarly, compliance regulations have a list of attributes (compliance requirements) defined in chapters of the regulation text. For each list of attributes, a given CSP is assessed on whether each specified attribute is fulfilled (yes or no). For each attribute a weighting may be performed (must/should/could). This may include CSP Security Profiling requirements.

The rating of one given CSP may be done according to the further specifications herein. In case an existing CSP cannot ensure a compulsory ("must") attribute in the list, a different CSP may be searched and detected. In case no CSP can fulfill the compulsory attribute, the deviation from full compliance or fulfillment may be covered by the CSP service consumer or a third party, if applicable.

The new CSP may being assessed according to the further specifications herein. Special focus may be given to compulsory attributes. A CSP without fulfilling a compulsory attribute usually cannot be selected. In case that two or more CSPs are fulfilling all compulsory criteria, the remaining "should" and "could" attributes may be used to decide on the customer selection. In an example, "should" attributes are weighted twice, "could" once. Additional attributes of the CSP can be defined and assessed according to the method for CSP selection such as reputation and financial strength of the CSP as reflected in rating agency listings. The cost aspect may be an attribute at the final selection of the CSP as well.

FIG. 8 depicts a flow diagram of an exemplary overall security- and compliance-aware deployment process providing a new approach to service arbitration for usage by a cloud services broker. This new approach introduces a new flow which consists of steps for CSP profiling, initial placement optimization and relocation optimization.

Step S801 comprises CSP Security/Compliance Profiling: In this step, the CSPs registered in the CSB are evaluated for eligibility to meet the requirement of a given security/compliance regulation by creating a security/compliance CSP profile. Step S801 is followed by step S802 in case of initial deployment or step S803 in case relocation of an already deployed service instance is required. Step S802 comprises Initial Security-/Compliance-based Placement Optimization: In this step, the best matching CSP and services for a given request are determined based on security/compliance attributes. Step S802 is followed by step S804. Step S803 comprises Security-/Compliance-based Relocation Optimization: In this step, the best matching CSP and services are determined for a given service instance based on the security/compliance attributes of the original request after a security/compliance violation found or services provided by the CSPs changed. Step S803 may be followed by step S805. Step S804 comprises Placement, i.e. the process of provisioning a service instance on a CSP. Step S805 comprises Relocation, i.e. the process for relocating workload from one CSP to another CSP in case the relocation optimization resulted in a decision for relocation in case that step S803 resulted in a positive decision for relocation.

FIG. 9 depicts a flow diagram of an exemplary security- and compliance-aware cloud service provider management process. The process for creating the Security/Compliance CSP profiles may be invoked by a Security/Compliance Optimization Engine of the CSB, e.g. on regular intervals. The Engine first checks (S901) for CSP updates using the Service Catalog Synchronization which updates the CSP registry. The CSP Security Profiling step S902 comprises creating a tabular profile of a CSP with check-marks or any other binary yes/no, true/false, 0/1 entries for the provider attributes for each of the security/compliance regulation supported by the CSB. Step S903 comprises updating the CSP registry with the security/compliance profile of CSP. Steps 902 and 903 may be repeated e.g. for each CSP registered in the CSP registry.

CSP Security Profiling may be done based on industry standards and regulatory requirements. A given CSP may operate one or more Cloud Sites. For a given CSP Site compliance matrix may be used to evaluate CSP Security Profiling. Exemplary requirements to be included in a standard profile may include, without limitation, ISO/IEC 27001:2013, ISO/IEC 27017:2015, ISO/IEC 27018:2014, SSAE 16 SOC 1, SSAE 16 SOC 2, SSAE 16 SOC 3, PCI DSS 3.1, EU Data Privacy, HIPAA, and FDA/GxP.

For a CSP with matching Security Profile to CSP consumers requirements, additional security and compliance settings may be evaluated. The table described above can be extended to such additional attributes and settings anytime. Exemplary additional requirements in an extended profile may include, without limitation, Data confidentiality, Integrity and availability is given, Security patch management is done, Access control and strong password verification is done, Strong encryption of communication and data is given, Malicious code detection and prevention is ensured, Data backup is available, Security incidents are being reported, and Business continuity management is given.

FIG. 10 depicts a flow diagram of an exemplary security- and compliance-aware service instance deployment process which may be performed by a security- and compliance-aware broker node (CSB). In step 1004 the CSB queries a runtime registry for a next instance to be assessed. In step S1005 the CSB analyzes the specifications and objectives of an original request for the inspected service instance (SI). In step S1006 the CSB gathers additional instance data and information. In step S1007 the CSB evaluates the collected data and compares the current fulfillment of the requirements to those included in the original request. If the evaluation discovers that a required attribute is now missing or a deterioration of fulfillment is found, the CSB continues with step S1008 and branches back to step S1004 otherwise to continue with checking a next SI. In step S1008 the CSB performs a relocation optimization, i.e. determines whether a CSP is available which complies to all compulsory requirements or at least offers a compliance or fulfillment profile which matches the original requirements better than the present CSP. If no such migration target can be determined, the CSB branches back to step S1004 to continue with assessing a next SI. If a better matching work node is determined, the relocation engine optionally contacts (S1009) an owner of the service instance about to be relocated for migration approval. If the owner does not approve the migration, the relocation engine branches back to step S1004 to assess a next SI. If the relocation engine receives the owner's approval or if step S1009 is left out, the relocation engine performs the relocation of the present SI to the determined new work node.

Figure 11:
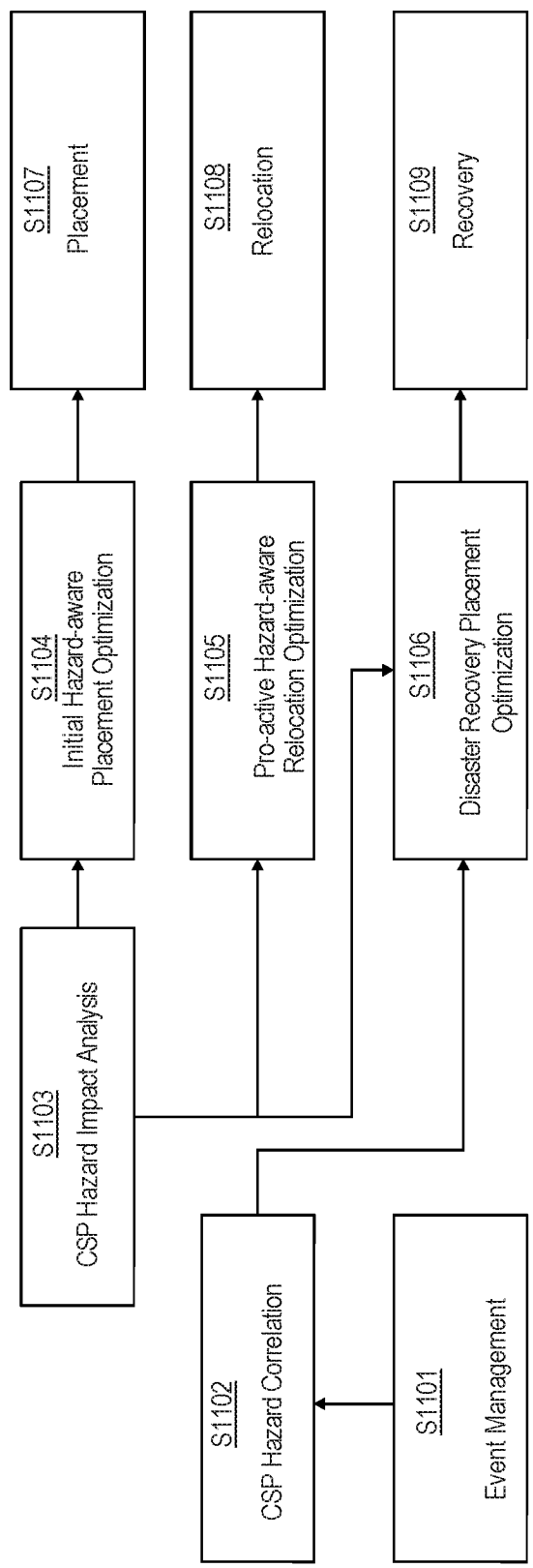
FIG. 11 depicts a flow diagram of an overall hazard risk-aware deployment process.

FIG. 11 depicts a flow diagram of an overall hazard risk-aware deployment process. Step S1101 comprises Event Management: In the case of the failure of a service instance at any of the CSP, event management of the CSB sends an event to CSP Hazard Correlation. Step S1101 is followed by step S1102. Step S1102 comprises CSP Hazard Correlation, i.e. analysis of events coming from the CSPs and checking if failure or services offline events are sent from the same CSP and site for multiple instances, correlating the events with the information from CSP Hazard Impact Analysis and triggering disaster recovery. Step S1102 may be followed by step S1106.

Step S1103 comprises CSP Hazard Impact Analysis: In this step, the CSPs registered in the CSB are evaluated for the impact of any arising or on-going hazard (natural or human) in the geographical location of the data centers of the CSPs. Depending on the risk, pro-active relocation or disaster recovery is triggered. Depending on the context, step S1103 is followed by step S1104 in case of an initial placement, may be followed by step S1105 in case of a relocation, or may be followed by step 1106 in case of disaster recovery.

Step S1104 comprises Initial Hazard-aware Placement Optimization: In this step, the best matching and safe CSP and services for a given request are determined based on analysis of the hazard impact for each CSP and its data centers. Step S1104 is followed by step S1107. Step S1105 comprises Pro-active Hazard-aware Relocation Optimization: In this step, the relocation of existing workloads to other, safe CSPs is planned in case of an arising or on-going hazard for the current CSP. Step S1105 is followed by step S1108. Step S1106 comprises Disaster Recovery Location Optimization: In this step, the recovery of the existing workloads is planned and the best matching CSP based on the original request and state information hold by the CSB about the current service instances. Step S1106 is followed by step S1109.

Step S1107 comprises Placement, i.e. the process of provisioning a service instance on a CSP. Step S1108 comprises Relocation, i.e. the process for relocating workload from one CSP to another CSP. Step S1109 comprises Recovery, i.e. the process of provisioning a service instance on a CSP and adjusting it to the same settings as the original instance.

Figure 12:
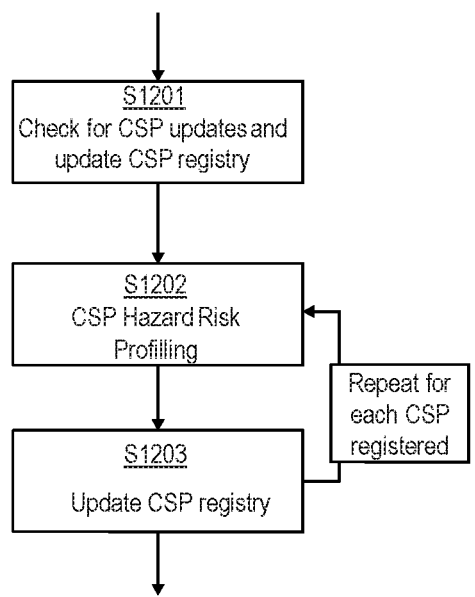
FIG. 12 depicts a flow diagram of a hazard risk-aware cloud service provider management process.

FIG. 12 depicts a flow diagram of an exemplary hazard risk-aware cloud service provider management process. The process for creating and updating CSP Hazard Risk Profiles may be invoked by a Hazard Correlation Engine of a CSB, e.g. on regular intervals. In step S1201 the engine checks for CSP updates using the Service Catalog Synchronization which updates the CSP registry. In step S1202 a CSP Hazard Risks Profiling module obtains first the list of all data centers of a CSP from the CSP registry and looks for hazard-related information. In step S1203 the engine updates the CSP registry with any hazard information found to apply for the given CSP. Steps S1202 and S1203 may be repeated e.g. for each CSP registered in the CSP registry.

Figure 13:
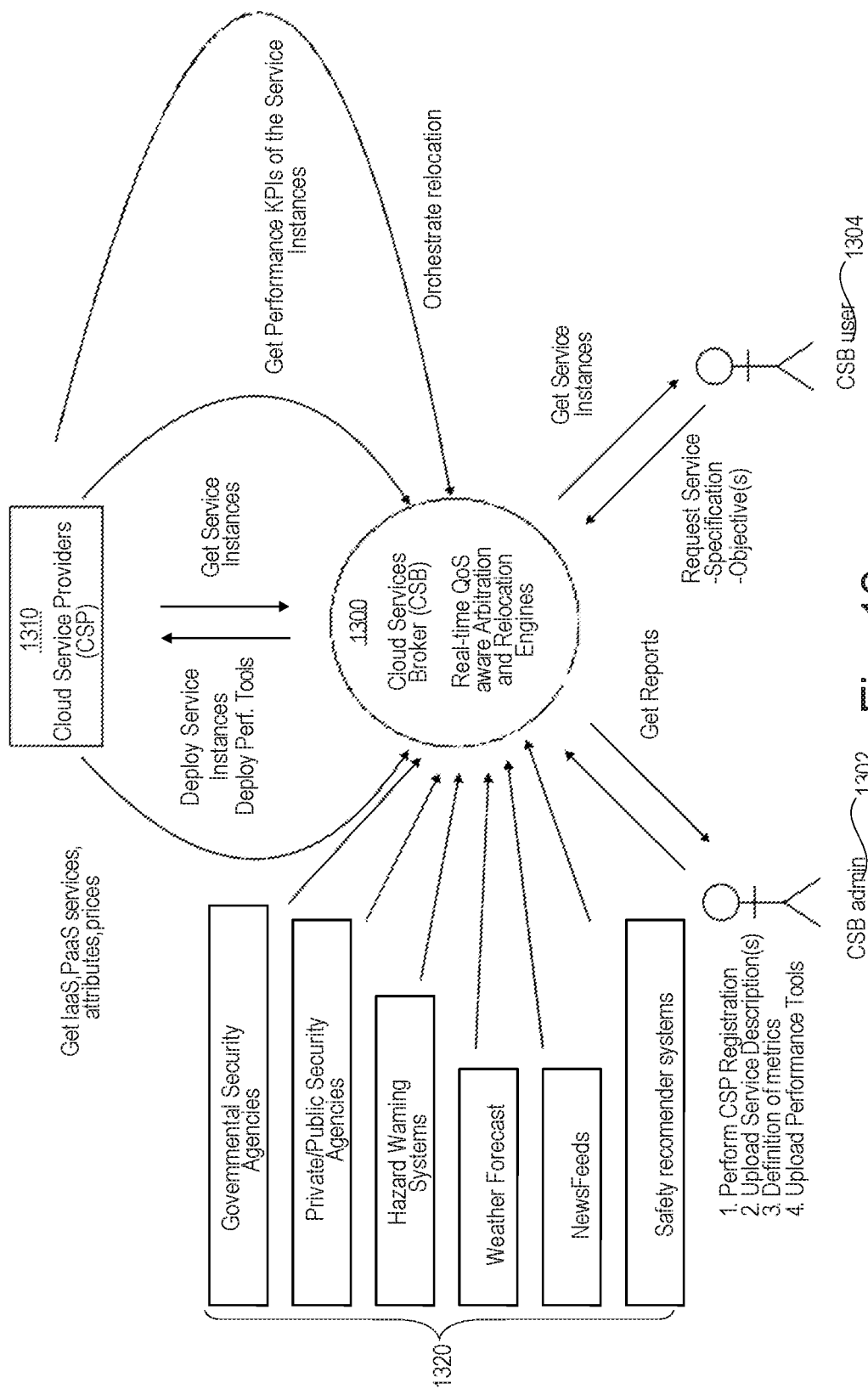
FIG. 13 illustrates an exemplary system context of a hazard risk-aware cloud service broker.

FIG. 13 illustrates an exemplary system context of a hazard risk-aware cloud service broker. Users may be divided into two roles: A CSB admin 1302 performs administrative and management tasks of the CSB 1300, such as performing CSP registrations, uploading service descriptions, defining metrics and uploading performance tools. A CSB user 1304 requests the deployment of cloud services and specifies the objective(s) to be considered when selecting a CSP 1310 for placement. The CSB 1300 interacts with the CSPs 1310 to retrieve information about cloud services available from the CSP 1310, attributes and prices, request the deployment of cloud services, retrieve information about cloud services instances, deploy performance measurement tools to gather metrics about the cloud service instances, and receive performance KPIs of the cloud service instances from APIs provided by the CSP 1310 and from the deployed performance measurement tools. The hazard and disaster aware CSB 1300 further receives real-time information on possible or ongoing threats from various information sources 1320 such as governmental, private or public security agencies, hazard warning systems, weather forecast services, newsfeeds, and safety recommender systems.

FIGS. 14-21 provide the basis for the following discussion of continuous and stepwise metrics and cost functions. The cost measure used throughout here solely for the purpose of demonstration and without limitation, is a level of spending in US-Dollars per year.

Figure 14:
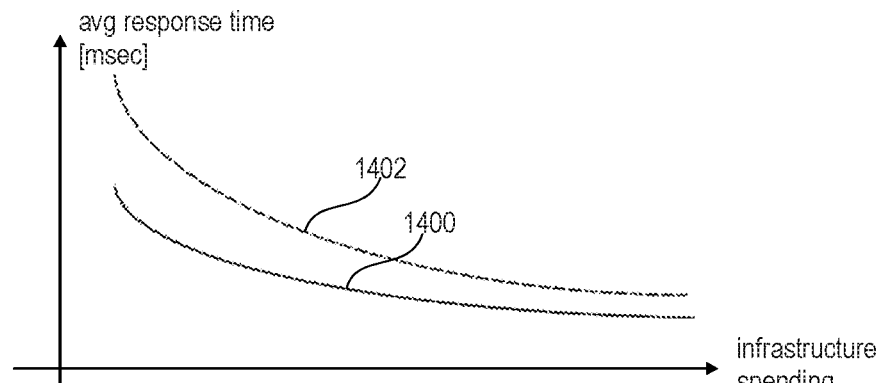
FIG. 14 depicts a plot of curves representing metrics for a continuous computing resource.

FIG. 14 depicts a plot of exemplary curves 1400, 1402 representing metrics for a continuous computing resource. For each CSP, using actual QoS measurements as described earlier in this disclosure, establish a function f: (criterion, CSP, spending)→QoS value from cloud operational cost (spending) per time unit (e.g. annual) to QoS achieved (e.g. response time). The example given in the Figure is a response time [msec] as a function of infrastructure spending [USD/year]. Both curves 1400, 1402 depict an asymptotically falling response time with increasing spending. The dashed upper curve 1402 (higher spending required to achieve a given response time) represents a subscription model with an additional service, such as data recovery, where a higher price per unit of the computing resource is charged for the additional service, the solid lower curve 1400 (lower spending required to achieve a given response time) represents a subscription model without the additional service, reflected in a lower price per unit of the computing resource. Each execution of the test deployment represents a single sample point on or close to one of these curves 1400, 1402. The curves 1400, 1402 can be understood as unknown real metrics or interpolated metrics as well.

Figure 15:
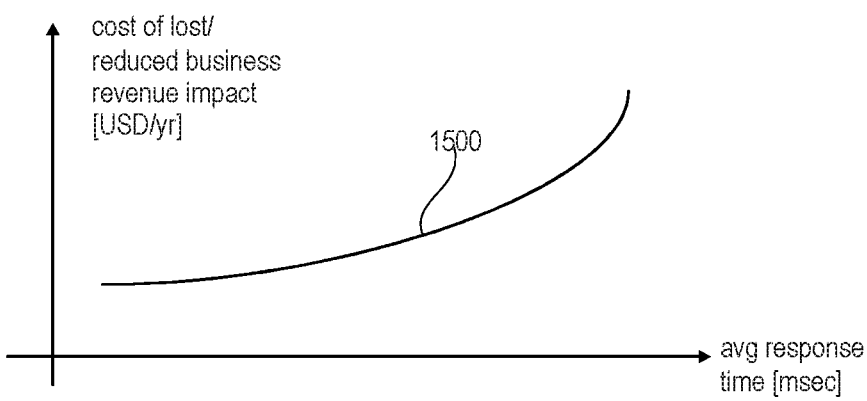
FIG. 15 depicts a plot of a curve representing a cost impact function for a continuous computing resource.

FIG. 15 depicts a plot of an exemplary curve 1500 representing a cost impact function for a continuous computing resource. The CSB operator is understood as a business which has a knowledge about the potential cost impact (which can also be referred to as excess costs or opportunity costs beyond the pure spending for the service) of arbitrating a service with a particular value of a QoS characteristic, which is again the response time in the depicted example. Curve 1500 is assumed to be CSP-independent and can be determined using automated methods, such as A/B testing and interpolating the cost variations observed for test workload executions under variable QoS conditions. Curve 1500 represents a function g: (criterion, QoS value)→cost to business, mapping a QoS parameter to the cost per time unit to the business if at or below that level. In the depicted example the curve is an increasing cost [USD/year revenue impact due to lost transactions/abandoned shopping carts/non-returning customers] as a function of response time [msec].

Figure 16:
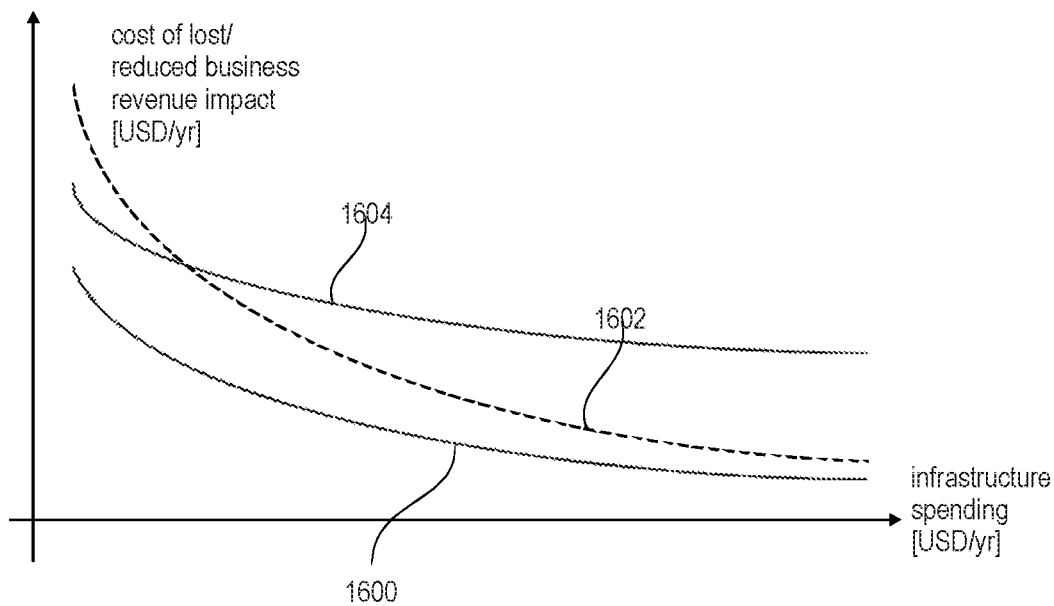
FIG. 16 depicts a plot of curves representing combinations of metrics with cost impact functions for a continuous computing resource.

FIG. 16 depicts a plot of exemplary curves 1600, 1602 and 1604 representing combinations of metrics with cost impact functions for a continuous computing resource. Each curve represents a combination of a metric and a cost impact function: h(criterion, CSP, spending)=g(criterion, f(criterion, CSP, spending)). The resulting functions h( . . . ) map cloud service spending to cost impact due to QoS shortfalls. Lower solid curve 1600 represents a first CSP without additional service (e.g. data recovery option), dashed curve 1602 represents the first CSP with an additional service, and upper solid curve 1604 represents a second CSP offering the first CSP's additional service by default. The combination functions h are asymptotically falling with increasing spending level.

Figure 17:
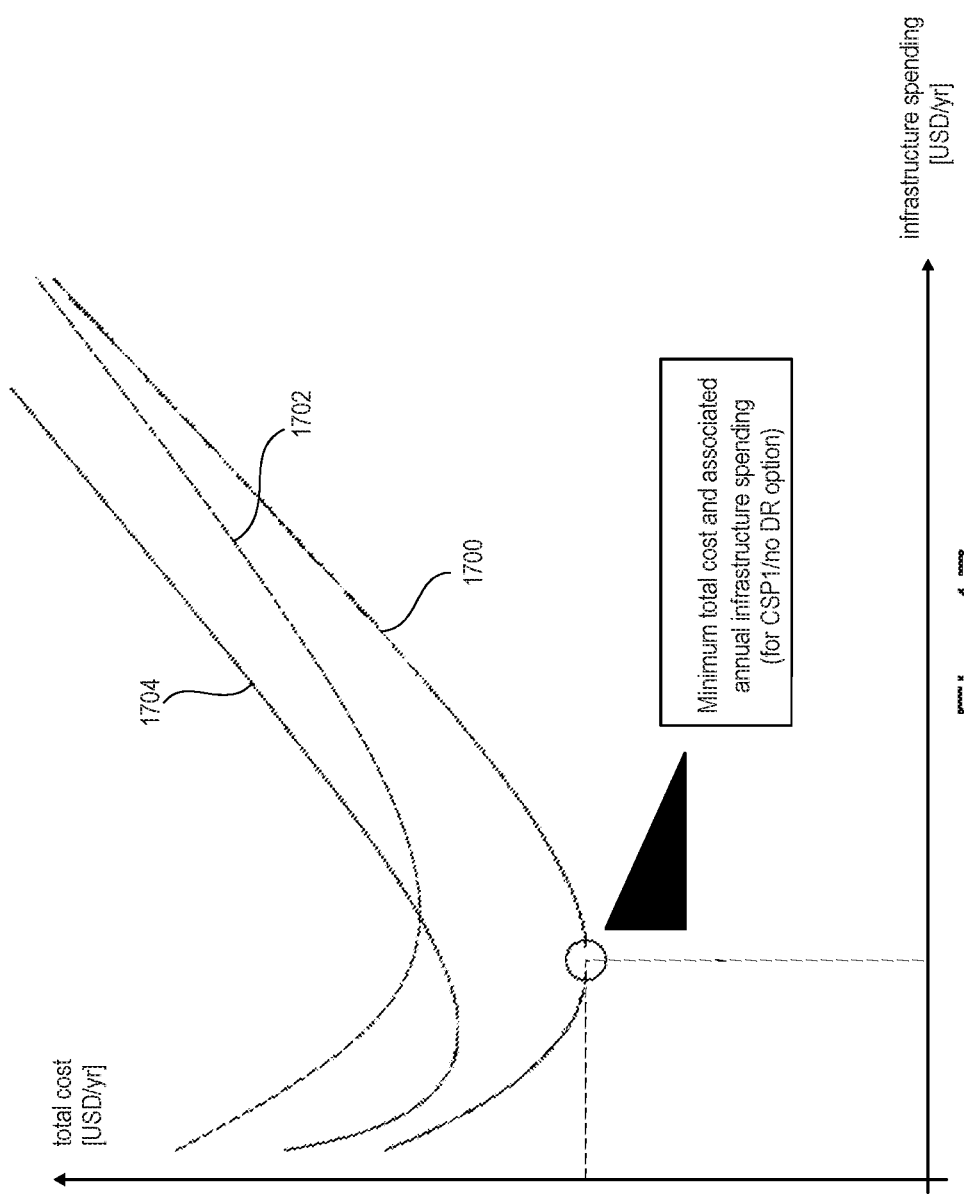
FIG. 17 depicts a plot of curves representing total cost functions for a continuous computing resource.

FIG. 17 depicts a plot of exemplary curves 1700, 1702, 1704 representing total cost functions for a continuous computing resource. In the depicted examples, the spending (identity function) is added to the combined functions from FIG. 16 to obtain respective total cost functions: total_cost (criterion, CSP, spending)=h(criterion, CSP, spending)+ spending. Lower solid curve 1700 represents a first CSP without additional service (e.g. data recovery option), dashed curve 1702 represents the first CSP with an additional service, and upper solid curve 1704 represents a second CSP offering the first CSP's additional service by default. Each curve features a total cost minimum at a different spending level.

FIGS. 18-21 are used in the following to discuss criteria that are associated either with a fixed annual cost (e.g. an annual fee for premium service) or not cost dependent at all and just something CSPs do or do not offer (e.g. HIPPA compliance). The first case also comprises multiple service levels with increasing (fixed) cost, e.g., basic→gold→platinum security packages.

The approach starts, for each necessary criterion or feature, establishing the impact of not having it, as an annual cost to the business (for example, for risk mitigation or insurance) and the reduced cost if the feature is available (for example, due to lower insurance premiums and/or lower probability of risks occurring). This may be done once, and can be considered to be CSP-independent. In an example, the binary feature is data encryption; the risk mitigated is data breach; cost of handling (tech & legal) is assumed to be $5M; the annual probability (if missing) is assumed as 5% and the annual probability (if present) as 0.5%. This results in an expected annual cost of risk (feature missing) of $250 k and an annual cost of risk (feature supported) of $25 k.

Figure 18:
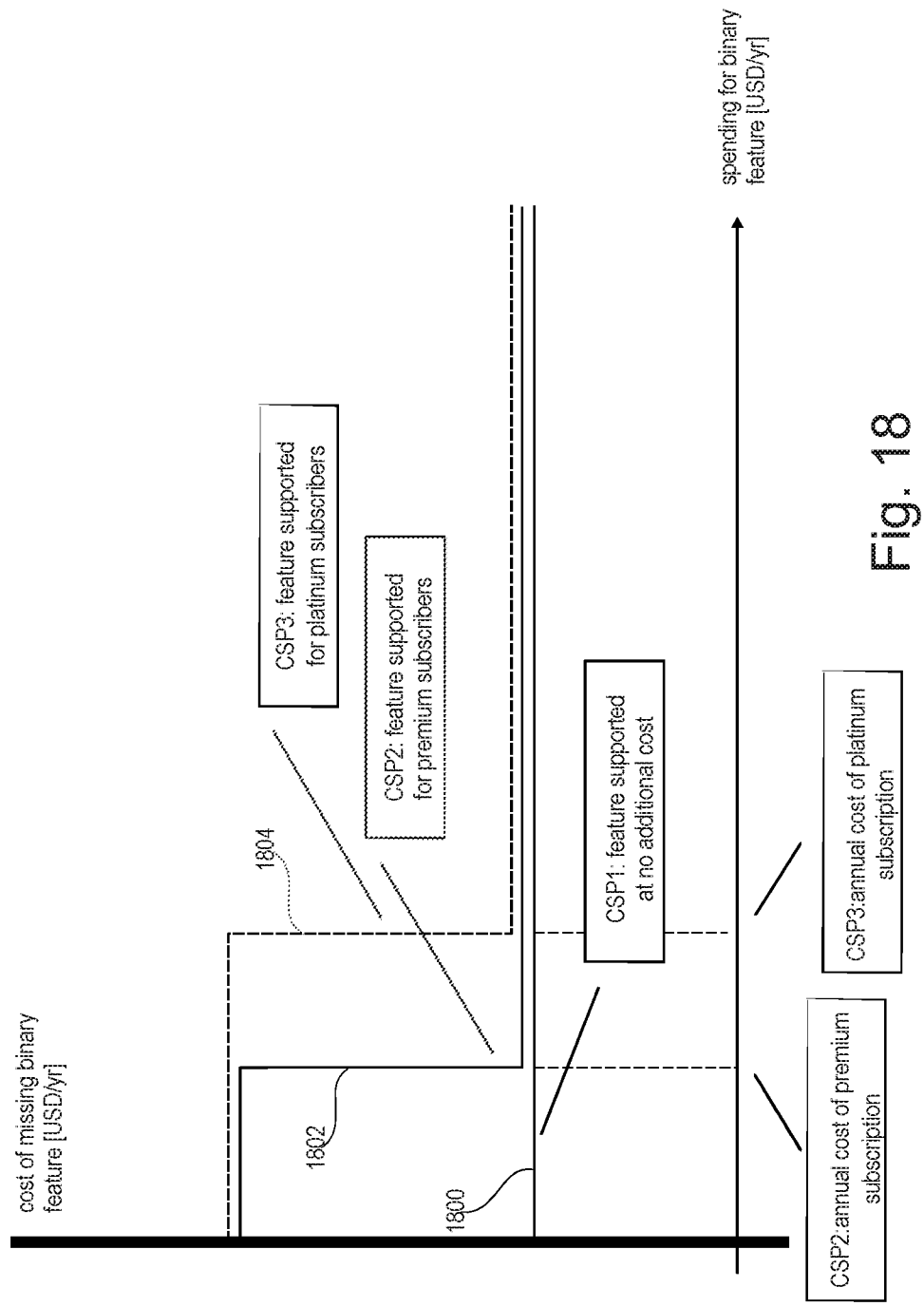
FIG. 18 depicts a plot of curves representing combinations of metrics with cost impact functions for a stepwise computing resource.

FIG. 18 depicts a plot of exemplary curves 1800, 1802, 1804 representing combinations of metrics with cost impact functions for a stepwise computing resource. The curves 1800, 1802, 1804 of the resulting combination functions h are constants (1800) or step curves (1802, 1804). Step curves show the cost to the business per CSP and criterion if spending level is below the (fixed) price for the criterion/feature, and the lowered (mitigated) cost when spending is at or above that threshold. Constant curve 1800 represents the case that a feature has no associated fixed-price tag, but is supported by a CSP by default. If one fixed-price expenditure (e.g., paying an annual fee for a premium subscription) enables several relevant features, the corresponding cost impact functions combine to step functions (curve 1802 representing a CSP 2 enabling the feature at a "premium" subscription level, curve 1804 representing a CSP 3 enabling the feature at a higher "platinum" subscription level). The vertical drop of step curves 1802, 1804 from their respective noncompliance constant level to their respective compliance constant level occurs at the fixed spending level for enabling the feature.

Figure 19:
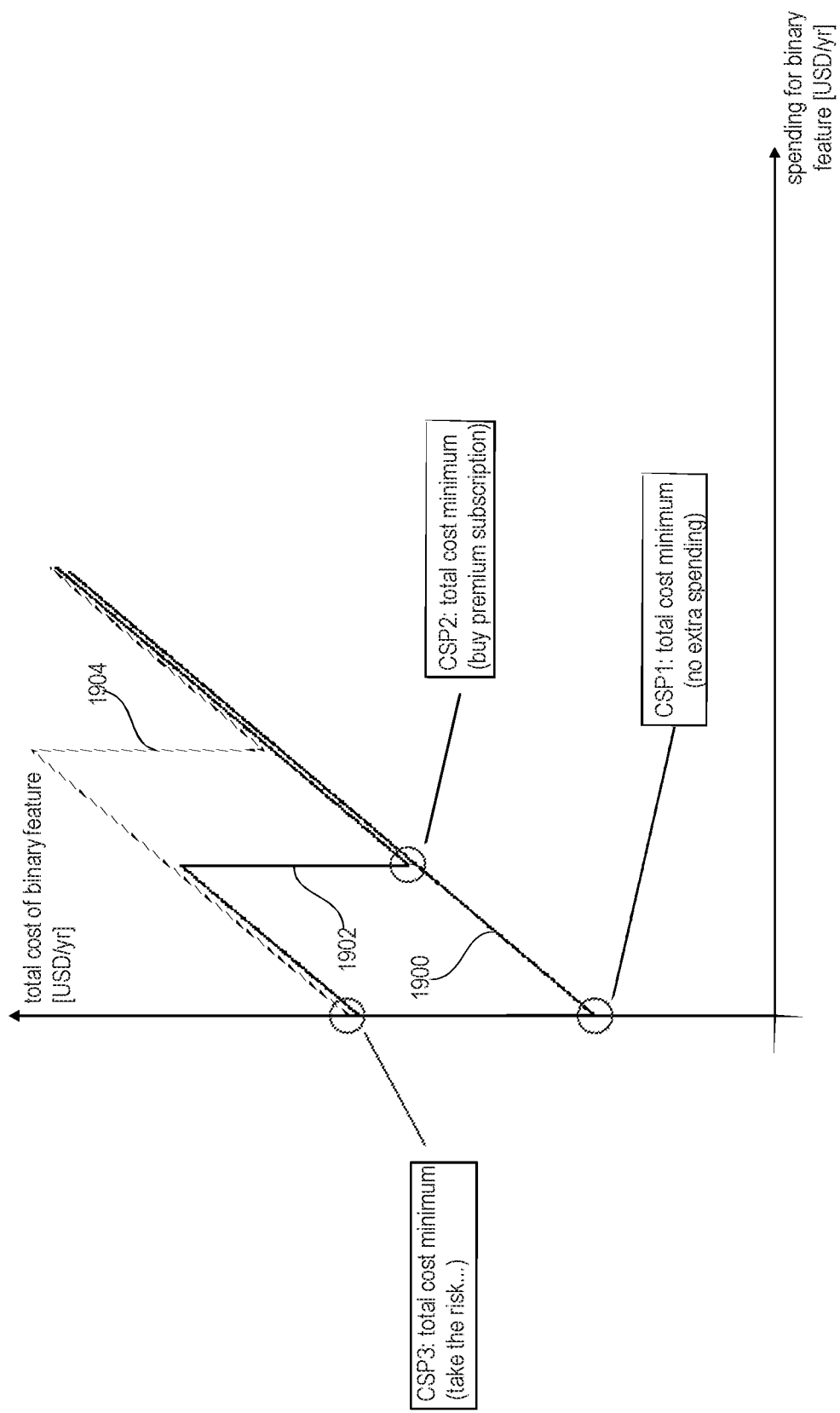
FIG. 19 depicts a plot of curves representing total cost functions for a stepwise computing resource.

FIG. 19 depicts a plot of exemplary curves 1900, 1902, 1904 representing total cost functions for a stepwise computing resource. In a similar manner as shown above for continuous cost functions, the cost of paying for a feature (x-axis) is added to the cost incurred when missing it or having it, respectively (depending on spending level) to obtain a total cost function. The examples shown here relate to the same exemplary CSPs as in FIG. 18. CSP 1, represented by straight curve 1900, has a total cost minimum at zero spending as the feature is offered at no additional cost. CSP 2, represented by solid "Z"-shaped curve 1902, offers the feature at premium subscription level to obtain the minimum of the total cost function at the spending level of the premium subscription, at a total cost for mitigated risk which is lower than the cost of the unmitigated risk. CSP 3, represented by dashed "Z"-shaped curve 1904, offers the security/compliance feature at a "platinum" subscription price which exceeds the cost benefit of the risk mitigation. As a result, the total cost minimum for CSP 3 is at zero spending, i.e. living with the risk being cheaper than buying the mitigation. CSP 1 has the lowest total cost minimum at price zero, followed by CSP 2 with a total cost minimum at premium spending level, and CSP 3 has the largest total cost minimum at zero spending.

FIG. 20 depicts a plot of an exemplary curve 2000 representing a combination of a metric with a cost impact function for a compulsory computing resource or feature. The noncompliance cost has been set to a value representing positive infinity. Therefore, curve 2000 corresponds to a step curve similar to step curves 1802, 1804 shown in FIG. 18 with the upper cost level being out of frame. Curve 2000 features a vertical drop from infinity at the spending level required for the compulsory feature, followed by a constant cost for higher spending values.

FIG. 21 depicts a plot of an exemplary curve 2100 representing a total cost function for a required computing resource or feature. Having the spending identity added to the combination function h once more, curve 2100 features a vertical drop from infinity at the spending level required for the compulsory feature, followed by total cost increasing at constant rate for higher spending values.

Compulsory features or criteria may be modeled in this framework by setting the cost of not having the feature to "infinite" (some very large number). The functions h(criterion, CSP, spending) and tc (total_cost) are constructed as in the previous cases.

If an additional feature such as data recovery (DR; mentioned in the discussion of FIGS. 14-17) impacts the cost of continuous evaluation criteria (e.g. 15% higher price per VM, per storage unit, etc.), then a CSP with and without the DR feature may be treated like two different CSPs with different QoS cost functions, as demonstrated for CSP1 with/without disaster recovery in the preceding Figures. In that case "CSP-with-the-feature" and "CSP-without-the-feature" are treated like two different CSPs. If the cost of DR is fixed, then it is modeled like other binary criteria (FIGS. 18, 19). If the cost of DR has both, usage-dependent and fixed components, then the fictitious CSP with DR has an additional must-have feature (FIGS. 20, 21) whose cost is the fixed cost of enabling DR. The same prescription for treating usage-dependent/fixed/mixed cost models applies for all evaluation criteria.

FIG. 22 depicts an exemplary table for aggregating cost minima for multiple execution requirements. For each (real or fictitious) CSP, the minimum total cost for each criterion under consideration is determined, along with the associated spending level, and the cost is summed up. The CSP with the lowest total cost overall may then be selected. In the example shown, the analysis has also revealed the required levels of spending on different features/criteria which can be applied in an automated fashion. All cost functions used in the CSP evaluation can be derived from real-time QoS measurements and published pricing and level of support for features offered by the CSPs. As a result, these functions can change as CSP pricing and service levels change. By periodically re-evaluating the total cost for all CSPs under considerations, the total-cost based optimization can dynamically adapt to movements in the CSP market.

The difference between the two cost figures (spending required (right column) and minimum total cost (central column)) is the cost of the remaining risk, or suboptimal solution performance. Reducing this further would require spending that exceeds the resulting cost benefits.

Figure 23:
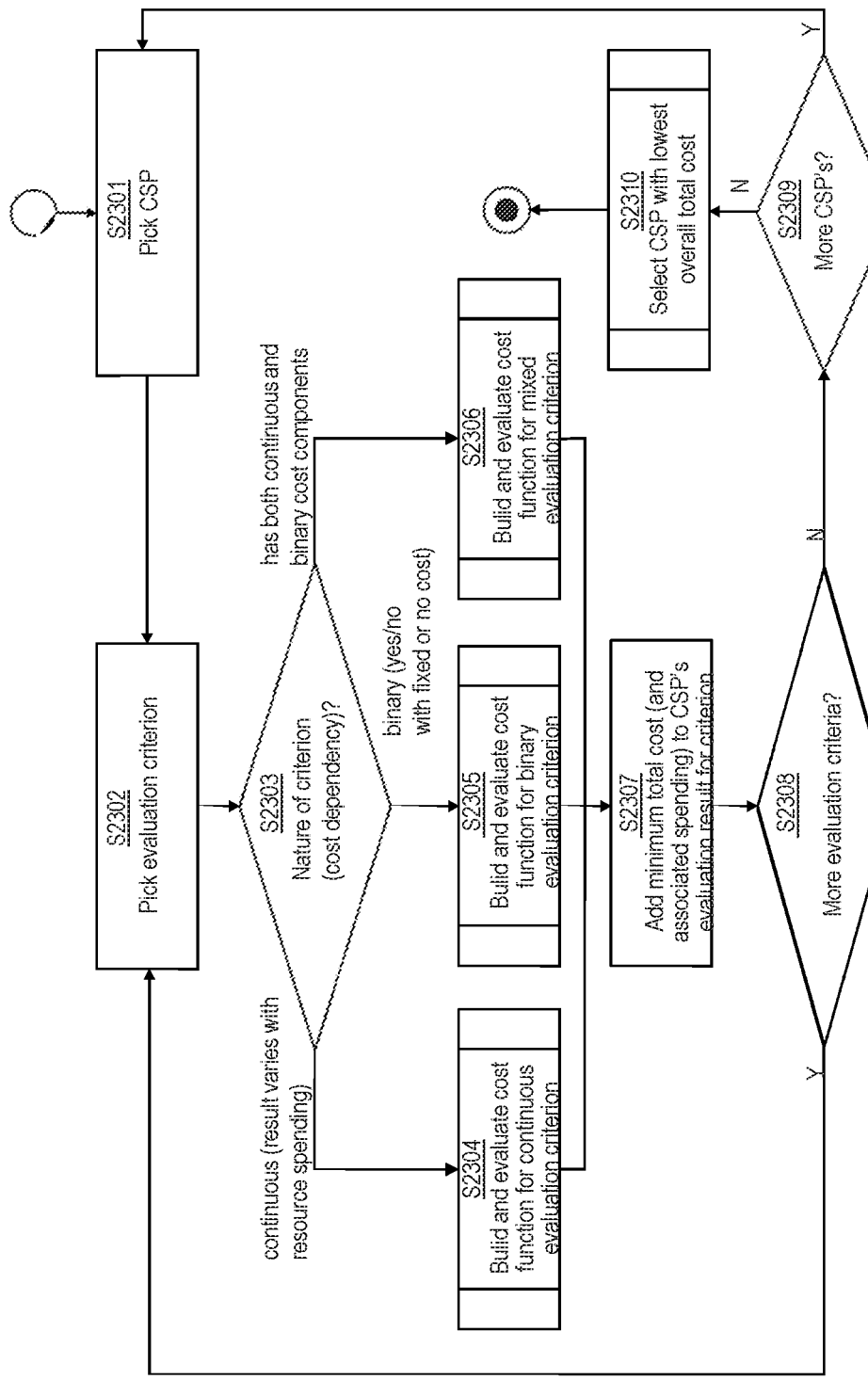
FIG. 23 depicts a flow diagram of an overall process for selecting a cloud service provider.

FIG. 23 depicts a flow diagram of an exemplary overall process for selecting a cloud service provider using multiple evaluation criteria. This process may be implemented by a CSB. In step S2301, the CSB selects a particular CSP work node for evaluation. In step S2302, the CSB selects a particular evaluation criterion to be assessed for the selected CSP. In step S2303 the broker determines the kind of criterion, i.e. the cost dependency structure which may be used for representing the criterion. In the example shown, the criterion can be continuous, binary, or a combination of a continuous and a binary criterion. If the criterion is continuous, the CSB continues with step S2304. If the criterion is binary, the CSB continues with step S2305. If the criterion is both continuous and binary, the CSB continues with step S2306.

Step S2304 comprises determining and evaluating a total cost function for the continuous evaluation criterion. Step S2305 comprises determining and evaluating a total cost function for the binary evaluation criterion. Step S2306 comprises determining and evaluating a total cost function for the mixed binary and continuous evaluation criterion. The evaluation according to any of steps S2304, S2305 and S2306 includes determining a minimum of the total cost function. In step S2307 the CSB adds the determined total cost minimum (and optionally the associated spending) to the aggregation data structure specific to the selected CSP node and criterion.

In step S2308 the CSB determines if further criteria shall be evaluated for the selected CSP node. If this is true, the CSB loops back to step S2302 to continue assessing the next criterion for the selected CSP. If not, the CSP continues with step S2309 which includes determining whether further CSPs shall be evaluated. If this is true, the CSB loops back to step S2301 to continue assessing the next CSP. If not, the CSP continues with step S2310 which includes selecting the CSP with the lowest overall total cost according to the aggregation data structure.

Figure 24:
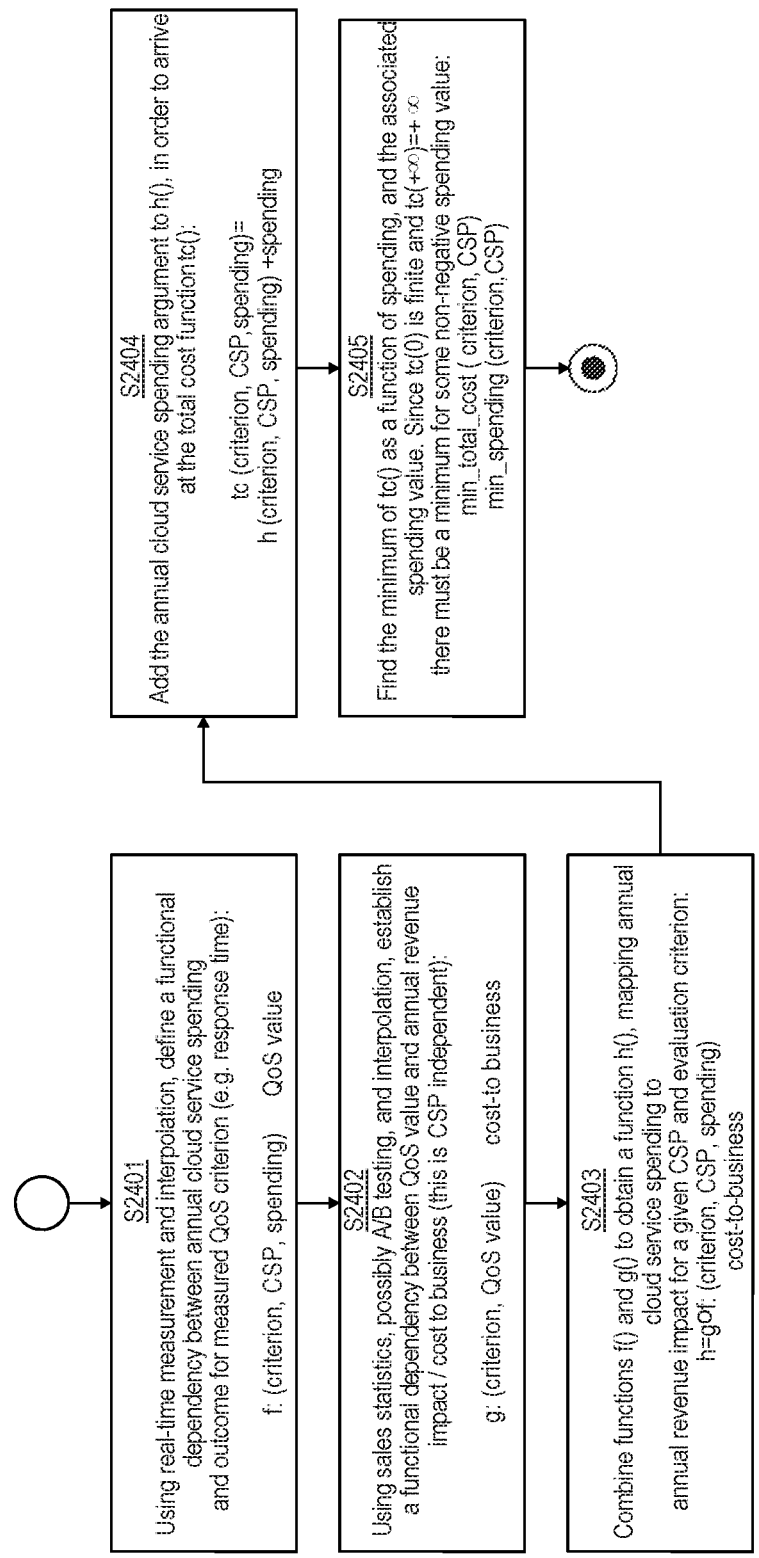
FIG. 24 depicts a flow diagram of a sub-process for building and evaluating a total cost function for a continuous computing resource.

FIG. 24 depicts a flow diagram of an exemplary sub-process for building and evaluating a total cost function for a continuous computing resource. This sub-process may be inserted for step S2304 described above. The sub-process starts with step S2401, wherein the CSB uses real-time measurements and interpolation to define a functional dependency between annual cloud service spending and the resulting metric (e.g. response time) for the measured QoS criterion: f: (criterion, CSP, spending)→QoS value. In step S2402, the CSB uses data extraction from sales statistics, automated A/B testing, and interpolation to establish a cost impact function, i.e. a functional dependency between the QoS value and a CSP-independent annual revenue impact or cost to business: g: (criterion, QoS value)→cost-to-business. In step S2403, the CSB combines functions f( ) and g( ) to obtain a combination function h( ) mapping annual cloud service spending to annual revenue impact for a given CSP and evaluation criterion: h=g○f: (criterion, CSP, spending) →cost-to-business. Expressed in an equivalent notation, combination function h( )=g(f( )). In step S2404, the CSB adds an annual cloud service spending argument to h( ), in order to arrive at the total cost function tc( ): tc (criterion, CSP, spending)=h (criterion, CSP, spending)+spending. In step S2405 the CSB determines a minimum of tc( ) (the absolute minimum or a minimum within a predetermined spending range) as a function of spending, and the associated spending value. In any case, since tc(0) is finite, and tc(+∞)=∞, there must be a minimum for a non-negative spending value: min_total_cost(criterion, CSP), min_spending(criterion, CSP).

Figure 25:
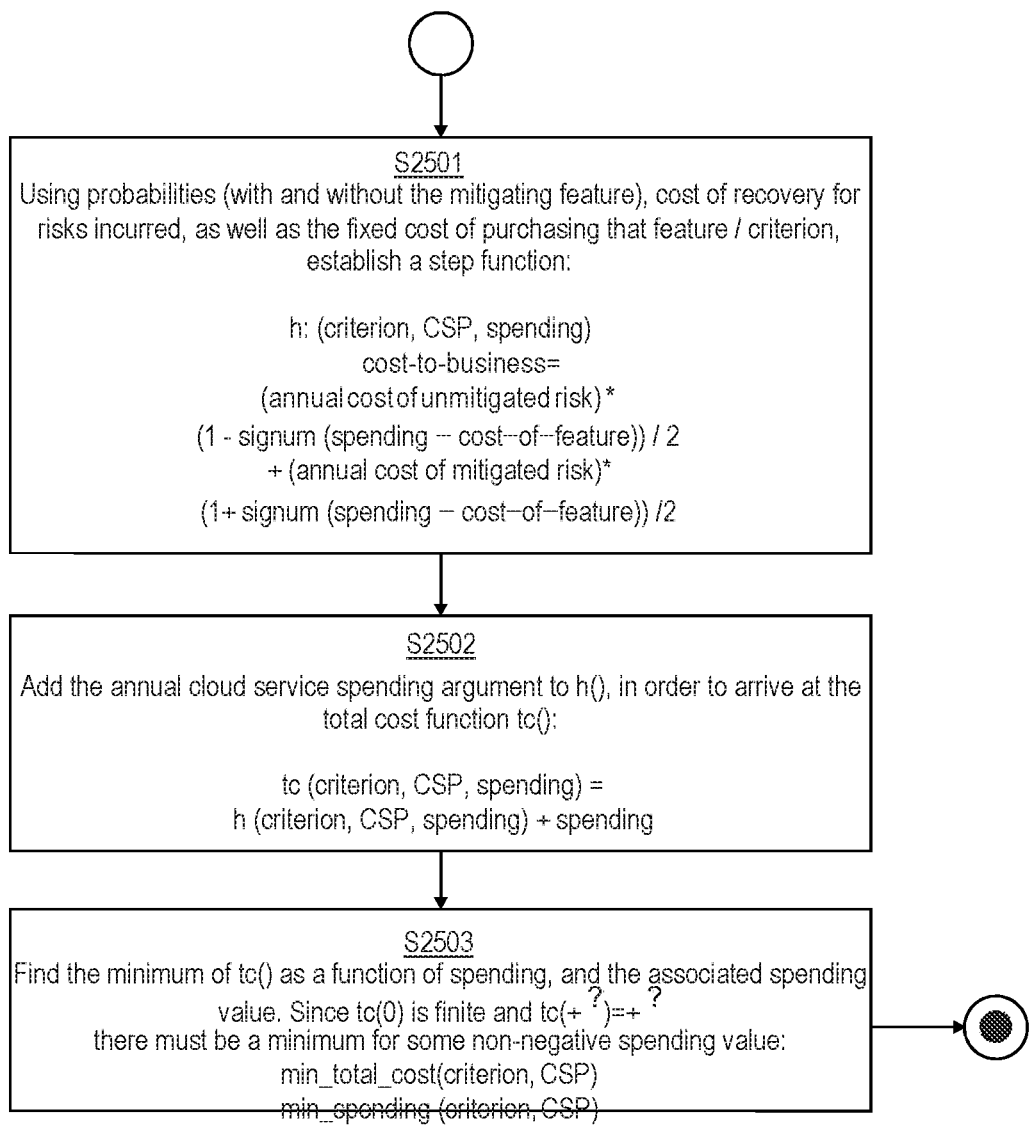
FIG. 25 depicts a flow diagram of a sub-process for building and evaluating a total cost function for a stepwise computing resource.

FIG. 25 depicts a flow diagram of a sub-process for building and evaluating a total cost function for a stepwise computing resource. This sub-process may be inserted for step S2305 described above. In step S2501 the CSB uses risk occurrence probabilities (with and without the mitigating feature), cost of recovery for risks incurred, as well as the fixed cost of purchasing the mitigating feature/criterion, to establish a step function h: (criterion, CSP, spending)→cost-to-business=(annual cost of unmitigated risk)×(1−signum (spending−cost-of-feature))/2+(annual cost of mitigated risk)×(1+signum(spending−cost-of-feature))/2. "Signum" represents the sign ("plus" or "minus", also "+" or "−") of the value of the associated term.) In step S2502 the CSB adds the annual cloud service spending argument to h0, in order to arrive at the total cost function tc( ): tc (criterion, CSP, spending)=h(criterion, CSP, spending)+spending. In step S2503 the CSB finds the minimum of tc( ) as a function of spending, and the associated spending value. In any case, since tc(0) is finite, and tc(+∞)=∞, there must be a minimum for a non-negative spending value: min_total_cost(criterion, CSP), min_spending(criterion, CSP).

Figure 26:
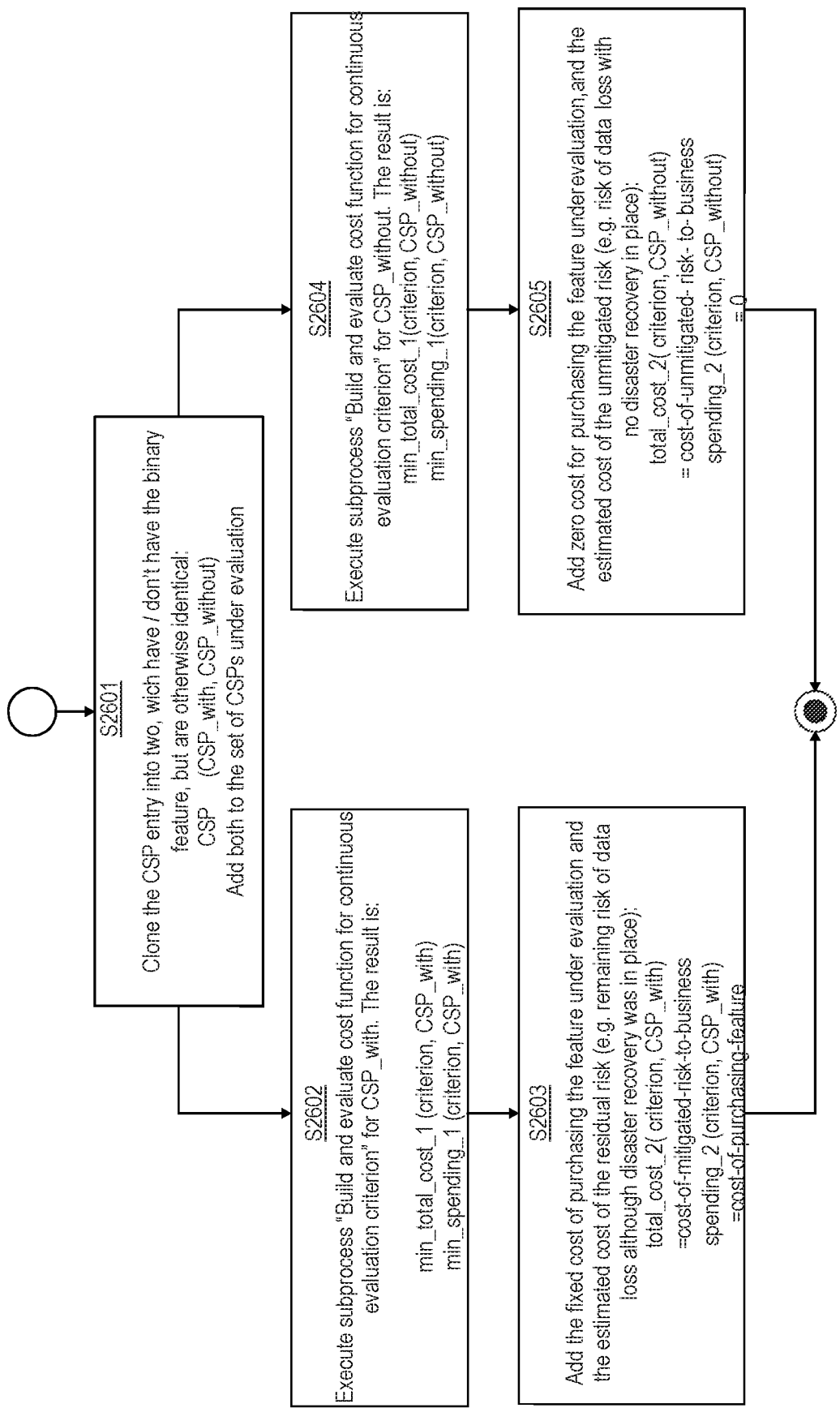
FIG. 26 depicts a flow diagram of a sub-process for building and evaluating a total cost function for a mixed stepwise and continuous computing resource.

FIG. 26 depicts a flow diagram of an exemplary sub-process for building and evaluating a total cost function for a mixed stepwise and continuous computing resource. This sub-process may be inserted for step S2306 described above. In step S2601 the CSB clones the CSP entry into two, which either have or do not have the binary feature but are otherwise identical: CSP→{CSP_with, CSP_without}. The CSB adds both clones to the set of CSPs under evaluation.

In the left branch, the CSB starts with step S2602 by executing the sub-process "Determine and evaluate a total cost function for a continuous evaluation criterion" (e.g. step S2304 in FIG. 23) for CSP_with. The resulting total cost minimum is designated min_total_cost_1(criterion, CSP_ with), and the associated spending is designated min_spending_1(criterion, CSP_with). Both are added to the aggregation data structure for CSP_with. Then, in step S2603 the CSB adds the fixed cost of purchasing the feature under evaluation and the estimated cost of the residual risk (e.g. remaining risk of data loss, although disaster recovery was in place) to the aggregation data structure for CSP_with. This results in the the incremental cost contribution total_ cost_2(criterion, CSP_with)=cost-of-mitigated-risk-to-business, and the associated spending spending_2(criterion, CSP_with)=cost-of-purchasing-feature. Both are added to the aggregation data structure for CSP_with.

In the right branch, the CSB starts with step S2604 by executing the sub-process "Determine and evaluate a total cost function for continuous evaluation criterion" (e.g. step S2304 in FIG. 23) for CSP_without. The resulting total cost minimum is designated min_total_cost 1(criterion, CSP_ without), and the associated spending is designated min_ spending_1(criterion, CSP_without). Both are added to the aggregation data structure for CSP_without. Then, in step S2605 the CSB adds zero purchasing cost and a constant total cost function using the estimated cost of the unmitigated risk (e.g. risk of data loss with no disaster recovery in place) to the aggregation data structure for CSP_without. This results in the incremental cost contribution total_cost_2 (criterion, CSP_without)=cost-of-unmitigated-risk-to-business, and the associated spending spending_2(criterion, CSP_without)=0. Both are added to the aggregation data structure for CSP_without.

Figure 27:
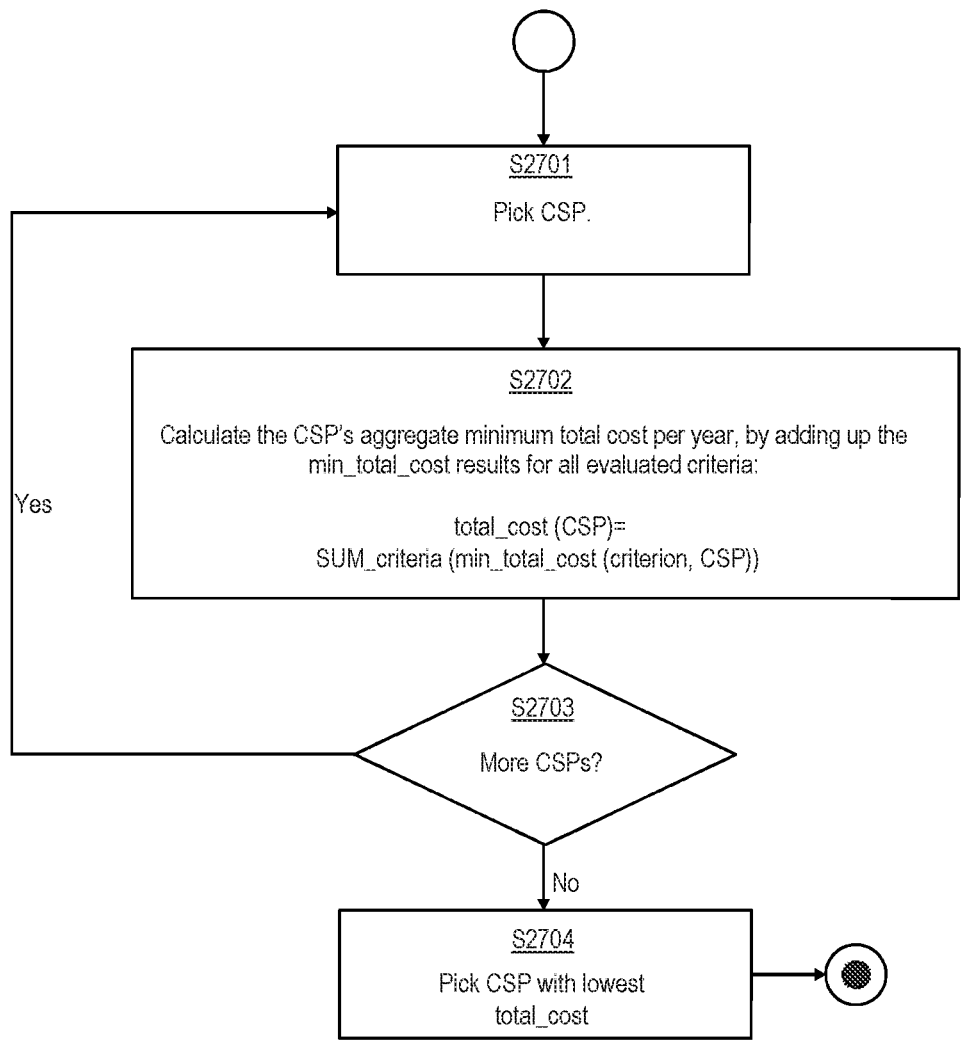
FIG. 27 depicts a flow diagram of a cloud service provider selection sub-process.

FIG. 27 depicts a flow diagram of an exemplary cloud service provider selection sub-process. This sub-process may be inserted for step S2310 described above. The sub-process starts with step S2701, wherein the CSB selects one of the CSPs which were previously evaluated for all applicable criteria. In step S2702 the CSB calculates the CSP's aggregate minimum total cost per year by adding up the min_total_cost results for all evaluated criteria: total_cost (CSP)=SUM_criteria (min_total_cost(criterion, CSP)). In step S2703 the CSB checks if more CSPs are to be processed, and if this is true, the CSB loops back to step S2701 for picking the next CSP. If total cost minimum aggregation was completed for all CSPs, the CSB continues with step S2704 to select the CSP with the lowest aggregated total_cost value as the executing node.

THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 28:
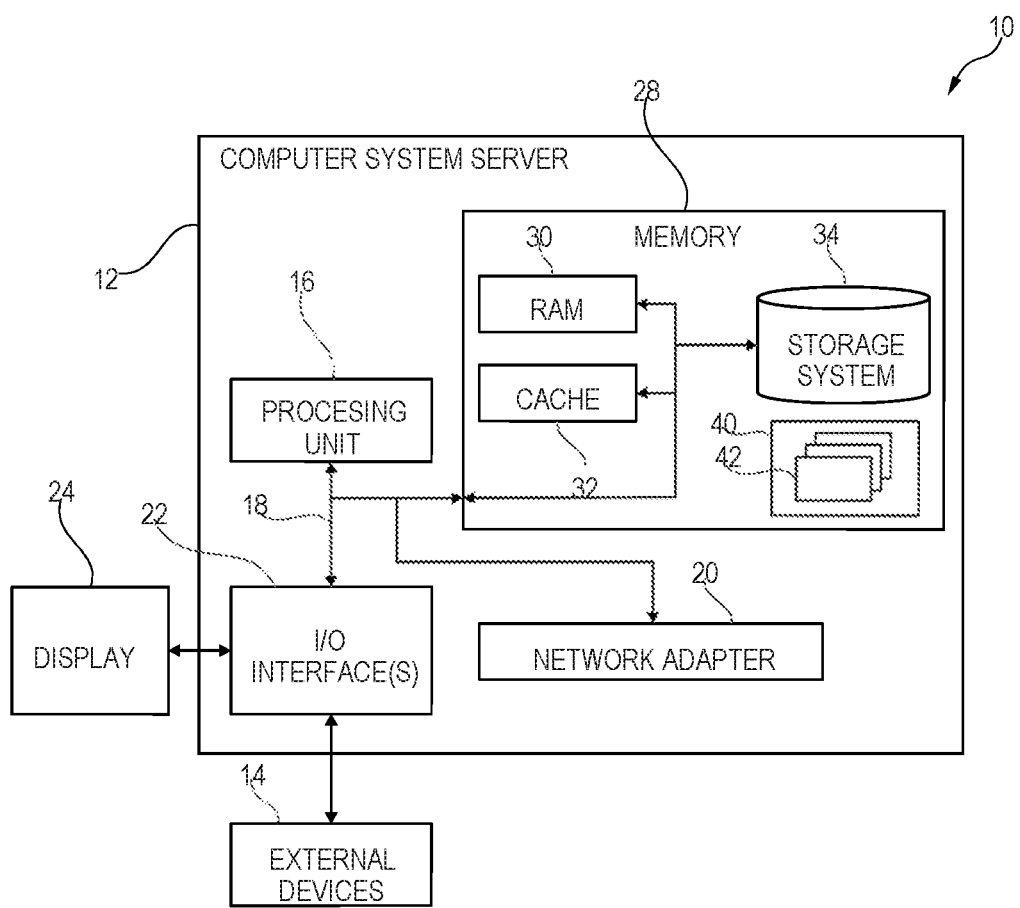
FIG. 28 depicts a cloud computing node according to an embodiment of the present invention.

Referring now to FIG. 28, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 28, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 29:
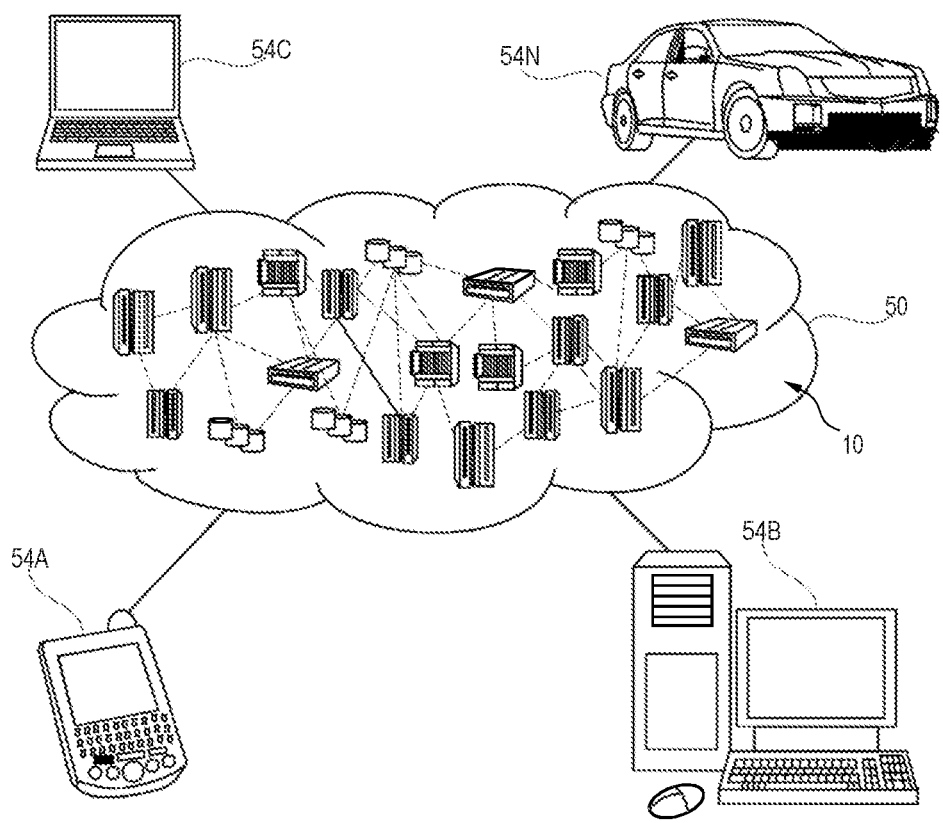
FIG. 29 depicts a cloud computing environment according to an embodiment of the present invention.

Referring now to FIG. 29, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 29 are intended to be illustrative only and that computing nodes 10 and cloud computing environment 50 can communicate with any type of computerized device over any type of network and/or network addressable connection (e.g., using a web browser).

Figure 30:
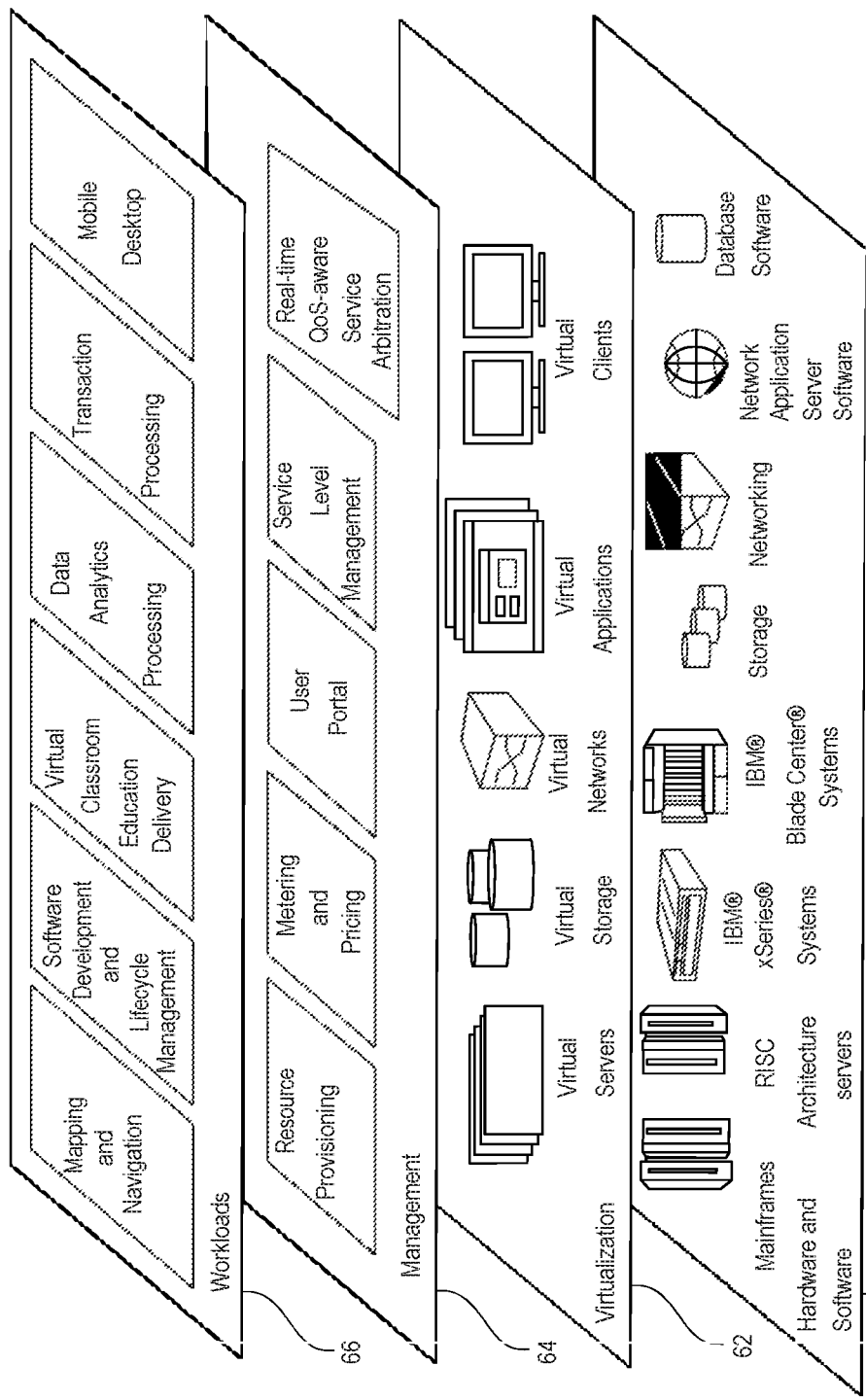
FIG. 30 depicts abstraction model layers according to an embodiment of the present invention.

Referring now to FIG. 30, a set of functional abstraction layers provided by cloud computing environment 50 (FIG. 29) is shown. It should be understood in advance that the components, layers, and functions shown in FIG. 30 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Real-time QoS aware arbitration provides selection of an executing node for executing a job workload based on a minimum of a total cost function.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Possible combinations of features described above can be the following:

1. A computer-implemented method for executing a job workload in a distributed computing infrastructure, the job workload having assigned an execution requirement to be observed during the execution, the execution requirement being related to a computing resource, the infrastructure comprising a broker node, two or more work nodes and a network communicatively interfacing each of the broker node and the work nodes, the method comprising utilizing a test deployment, the test deployment comprising: receiving a test workload, the test workload having assigned the execution requirement, and a specification of a test node out of the work nodes; providing the test workload to the test node; causing the test node to execute the test workload and observe the execution requirement during the execution of the test workload; causing the test node to vary a status of the computing resource of the test node, execute the test workload using the varied resource and observe the execution requirement during the execution of the test workload using the varied resource; and in response to each execution of the test workload by the test node, receiving a metric, the metric quantifying a response of the test node to the status of the computing resource during the execution, the method further comprising, by the broker node: creating a measuring workload, the measuring workload having assigned the execution requirement; selecting a first and a second candidate node out of the work nodes; performing the test deployment with the test workload being the measuring workload, the test node being the first candidate node, and the metric being a first metric; performing the test deployment with the test workload being the measuring workload, the test node being the second candidate node, and the metric being a second metric; determining a cost impact function of the metric; determining a first total cost function from the first metric and the cost impact function, and determining a second total cost function from the second metric and the cost impact function; determining a first minimum of the first total cost function and a second minimum of the second total cost function; based on the first minimum and the second minimum, selecting one of the first candidate node and the second candidate node as an executing node for executing the job workload; and causing the executing node to execute the job workload.

2. The method of embodiment 1, the first total cost function comprising a sum of a first spending function for the computing resource of the first candidate node and a combination function of the first metric with the cost impact function, the second total cost function comprising a sum of a second spending function for the computing resource of the second candidate node and a combination function of the second metric with the cost impact function.

3. The method of embodiment 1 or 2, wherein, in case the execution requirement comprises a continuously variable criterion, the determination of the first total cost function comprises determining a first continuous metric interpolating the first metric and determining the first total cost function from the first continuous metric and the cost impact function, and the determination of the second total cost function comprises determining a second continuous metric interpolating the second metric and determining the second total cost function from the second continuous metric and the cost impact function.

4. The method of any of the previous embodiments, wherein, in case the execution requirement comprises a binary condition, the cost impact function comprises a compliance constant representing the case that the binary condition is observed and a noncompliance constant representing the case that the binary condition is not observed.

5. The method of embodiment 4, wherein, in case the binary condition is compulsory, the compliance constant is set to a finite value and the noncompliance constant is set to a value representing positive infinity.

6. The method of embodiment 4 or 5, wherein, in case the execution requirement further comprises a continuously variable criterion, the first and second total cost functions are respectively determined as first and second compliant total cost functions for the case that the binary condition is observed and as first and second noncompliant total cost functions for the case that the binary condition is not observed, the first minimum and the second minimum being respectively determined as first and second compliant minima of the first and second compliant total cost functions and as first and second noncompliant minima of the first and second noncompliant total cost functions, the selection of the executing node being based on the first and second compliant minima and the first and second noncompliant minima.

7. The method of any of the previous embodiments, the execution requirement being taken from a group of execution requirements, each execution requirement being related to a computing resource, the method further comprising repeating, for each execution requirement in the group of execution requirements, the creation of the measuring workload, the performance of the test deployment with the test node being the first candidate node, the performance of the test deployment with the test node being the second candidate node, the determination of the cost impact function, the determination of the first and second total cost functions, and the determination of the first and second minima, the method further comprising, for at least part of the execution requirements in the group, aggregating the respective first minima to a first aggregate minimum and aggregating the respective second minima to a second aggregate minimum, the selection of the executing node being based on the first aggregate minimum and the second aggregate minimum.

8. The method of any of the previous embodiments, further comprising, during the execution of the job workload, repeating the test deployment with the test workload being the measuring workload, the test node being the first candidate node, and the metric being an updated first metric.

9. The method of embodiment 8, further comprising: repeating, during the execution of the job workload, the test deployment with the test workload being the measuring workload, the test node being the second candidate node, and the metric being an updated second metric; determining an updated first total cost function from the updated first metric and the cost impact function, and determining an updated second total cost function from the updated second metric and the cost impact function; determining an updated first minimum of the updated first total cost function and an updated second minimum of the updated second total cost function; based on the updated first minimum and the updated second minimum, selecting one of the first candidate node and the second candidate node as an updated executing node for executing the job workload; and in case the updated executing node differs from the executing node, relocating the job workload to the updated executing node.

10. The method of embodiment 9, the determination of the first and second total cost functions, the determination of the updated first and second minima and the selection of the updated executing node being performed only in case that at least one of the following is true: the updated first metric differs from the first metric; the updated second metric differs from the second metric; the cost impact function differs from the cost impact function used during the determination of the first and second total cost functions; and the execution requirement differs from the execution requirement used during the test deployment with the metric being the first or second metric.

11. The method of embodiment 9 or 10, further comprising querying an owner of the job workload for an approval for the relocation, the relocation being performed only in response to receiving the approval.

12. The method of embodiment 9, 10 or 11, the infrastructure further comprising a load balancing node, the execution of the job workload by the executing node being performed as a former instance, the relocation comprising causing the executing node to provision a new instance of the job workload, causing the executing node to halt the execution of the previous instance, migrating one or more artifacts of the job workload from the executing node to the updated executing node, causing the updated executing node to register the new instance at the load balancing node, causing the updated executing node to execute the new instance, causing the load balancing node to deregister the former instance, and causing the executing node to destroy the former instance.

13. The method of any of the previous embodiments, the execution requirement comprising a compulsory condition, the selection of the first and the second candidate node further comprising preventing the selection of a given work node as the first or the second candidate in case the given work node is unsupportive of the compulsory condition.

14. The method of any of the previous embodiments, the execution requirement comprising two or more binary security and/or compliance conditions, the selection of the executing node comprising determining a compliance counter for each of the first and the second candidate node, the compliance counter for a given candidate node comprising a quantity of the security and/or compliance conditions which can be fulfilled by the given candidate node, the selection of the executing node further comprising selecting the given candidate node if its compliance counter is largest and the respective first or second minimum for the given candidate node is less than or equal to a predefined total cost threshold value.

15. The method of any of the previous embodiments, further comprising receiving failure notifications related to the executing node, determining a first correlation metric from the failure notifications received within a predetermined time window, and in case the first correlation metric lies within a predetermined first correlation range, determining out of the two or more work nodes a first group of safe work nodes from which no correlated failure notification was received, selecting a first safe executing node from the first group of safe work nodes, and relocating the job workload to the first safe executing node.

16. The method of embodiment 15, the selection of the first safe executing node comprising, for each safe work node in the first group of safe work nodes, performing the test deployment with the test workload being the measuring workload, the test node being the safe work node, and the metric being a third metric; determining a third total cost function from the third metric and the cost impact function; and determining a third minimum of the third total cost function, the selection of the first safe executing node further comprising selecting a given safe work node out of the first group of safe work nodes if its third minimum is smallest.

17. The method of any of the previous embodiments, further comprising receiving a hazard forecast, determining a second correlation metric between the hazard forecast and each of the work nodes, and in case the second correlation metric between the hazard forecast and the executing node lies within a predetermined second correlation range, determining out of the two or more work nodes a second group of safe work nodes for which the second correlation metric lies out of the second correlation range, selecting a second safe executing node from the group of safe work nodes, and relocating the job workload to the second safe work node.

18. The method of embodiment 17, the selection of the second safe executing node comprising, for each safe work node in the second group of safe work nodes, performing the test deployment with the test workload being the measuring workload, the test node being the safe work node, and the metric being a fourth metric; determining a fourth total cost function from the fourth metric and the cost impact function; and determining a fourth minimum of the fourth total cost function, the selection of the second safe executing node further comprising selecting a given safe work node out of the second group of safe work nodes if its fourth minimum is smallest.

19. The method of any of the previous embodiments, the selection of the executing node comprising selecting the first candidate node in case the first minimum is less than or equal to the second minimum, and selecting the second candidate node in case the first minimum is greater than the second minimum.

20. The method of any of the previous embodiments, the metric comprising one or more of the following: a processing time or rate of the execution of the test workload by the test node; a response time or rate of the test node during the execution of the test workload; an availability figure of the test node during the execution of the test workload; a service figure descriptive of a service level fulfilled by the test node during the execution of the test workload; a binary status of fulfillment of a security, compliance, or service condition by the test node during the execution of the test workload; a disaster recovery time or rate of the test node; and a price charged for a service used or implemented by the test node for the execution of the test workload.

21. The method of any of the previous embodiments, the distributed computing infrastructure comprising a cloud computing environment, the execution of the job workload being provided as a service in the cloud computing environment, the method being implemented as a function of a management layer of the cloud computing environment.

22. The method of embodiment 21, the first and the second candidate node being operated by different service providers of the service.

23. A computer program product, in particular a computer readable medium, the computer program product carrying computer-executable instructions for execution by a processor controlling an apparatus, wherein execution of the instructions causes the processor to perform a method for executing a job workload in a distributed computing infrastructure, the job workload having assigned an execution requirement to be observed during the execution, the execution requirement being related to a computing resource, the infrastructure comprising a broker node, two or more work nodes and a network communicatively interfacing each of the broker node and the work nodes, the method comprising utilizing a test deployment, the test deployment comprising: receiving a test workload, the test workload having assigned the execution requirement, and a specification of a test node out of the work nodes; providing the test workload to the test node; causing the test node to execute the test workload and observe the execution requirement during the execution of the test workload; causing the test node to vary a status of the computing resource of the test node, execute the test workload using the varied resource and observe the execution requirement during the execution of the test workload using the varied resource; and in response to each execution of the test workload by the test node, receiving a metric, the metric quantifying a response of the test node to the status of the computing resource during the execution, the method further comprising, by the broker node: creating a measuring workload, the measuring workload having assigned the execution requirement; selecting a first and a second candidate node out of the work nodes; performing the test deployment with the test workload being the measuring workload, the test node being the first candidate node, and the metric being a first metric; performing the test deployment with the test workload being the measuring workload, the test node being the second candidate node, and the metric being a second metric; determining a cost impact function of the metric; determining a first total cost function from the first metric and the cost impact function, and determining a second total cost function from the second metric and the cost impact function; determining a first minimum of the first total cost function and a second minimum of the second total cost function; based on the first minimum and the second minimum, selecting one of the first candidate node and the second candidate node as an executing node for executing the job workload; and causing the executing node to execute the job workload.

The invention claimed is:

1. A computer-implemented method utilizing a plurality of test deployments for executing a job workload in a distributed computing infrastructure comprising a broker node and a plurality of work nodes from a plurality of cloud service providers, the job workload having an execution requirement related to computing resources of the plurality of work nodes, the method comprising:

performing a first test deployment, comprising:
receiving a first test workload, the first test workload having assigned the execution requirement of the job workload;
querying a cloud service provider registry to identify a set of eligible work nodes from the plurality of cloud service providers;
matching three or more work nodes from the set of eligible work nodes based, at least in part, on the execution requirement and a plurality of service specifications of the set of eligible work nodes;
receiving a specification of a test node out of the three or more work nodes;
providing the first test workload to the test node;
instructing the test node to execute the first test workload a plurality of times using the computing resource and observe a plurality of test metrics quantifying responses of the test node to a status of a computing resource of the test node with respect to the execution requirement during the plurality of executions of the first test workload by:
instructing the test node to vary the status of the computing resource of the test node, execute the first test workload using the varied status; and
in response to each execution of the first test workload by the test node:
receiving a test metric, the test metric quantifying a response of the test node to the status of the computing resource with respect to the execution requirement during the execution;

the method further comprising, by the broker node, in response to performing the first test deployment:
creating a measuring workload, the measuring workload having assigned the execution requirement, and wherein the measuring workload is derived from the job workload to reflect the resource consumption conditions of the job workload while exhibiting a substantially smaller computing resource consumption than the job workload,
selecting a first and a second candidate node out of the three or more work nodes other than the test node,
performing a second test deployment with a second test workload being the measuring workload, a specification of the first candidate node, and measuring a plurality of first metric values, based on the plurality of test metrics, from performance of the second test deployment,
performing a third test deployment with a third test workload being the measuring workload, a specification of the second candidate node, and measuring a plurality of second metric values, based on the plurality of test metrics, from performance of the third test deployment,
determining a cost impact function of the plurality of test metrics,
determining a first total cost function from the plurality of first metric values and the cost impact function, and determining a second total cost function from the plurality of second metric values and the cost impact function,
determining a first minimum of the first total cost function and a second minimum of the second total cost function,
based on the first minimum and the second minimum, selecting one of the first candidate node and the second candidate node as an executing node for executing a job workload that minimizes a cost, and
causing the executing node to execute the job workload.

2. The method of claim 1, wherein the first total cost function comprising a sum of a first spending function for a computing resource of the first candidate node and a first combination function corresponding to a combination of the plurality of first metric values with the cost impact function, the second total cost function comprising a sum of a second spending function for the computing resource of the second candidate node and a second combination function corresponding to a combination of the plurality of second metric values with the cost impact function.

3. The method of claim 1, wherein, the execution requirement comprises a continuously variable criterion, the determination of the first total cost function comprises determining a first continuous metric interpolating the plurality of first metric values and determining the first total cost function from the first continuous metric and the cost impact function, and the determination of the second total cost function comprises determining a second continuous metric interpolating the plurality of second metric values and determining the second total cost function from the second continuous metric and the cost impact function.

4. The method of claim 1, wherein the execution requirement comprises a binary condition, the cost impact function comprises a compliance constant representing a first case that the binary condition is observed and a noncompliance constant representing a second case that the binary condition is not observed.

5. The method of claim 4, wherein, the binary condition is compulsory, the compliance constant is set to a finite value and the noncompliance constant is set to a value representing positive infinity.

6. The method of claim 4, wherein:
the execution requirement further comprises a continuously variable criterion;
the first and second total cost functions are respectively determined as first and second compliant total cost functions for the first case that the binary condition is observed and as first and second noncompliant total cost functions for the second case that the binary condition is not observed;
the first minimum and the second minimum being respectively determined as first and second compliant minima of the first and second compliant total cost functions and as first and second noncompliant minima of the first and second noncompliant total cost functions;
the selection of the executing node being based on the first and second compliant minima or the first and second noncompliant minima.

7. The method of claim 1, the execution requirement being taken from a group of execution requirements, each execution requirement being related to the computing resource, the method further comprising repeating, for each execution requirement in the group of execution requirements, creation of the measuring workload, the performance of the second test deployment with the test node being the first candidate node, the performance of the third test deployment with the test node being the second candidate node, the determination of the cost impact function, the determination of the first and second total cost functions, and the determination of a first and second minima, the method further comprising, for at least part of the execution requirements in the group, aggregating a respective first minima to a first aggregate minimum and aggregating the respective second minima to a second aggregate minimum, the selection of the executing node being based on the first aggregate minimum and the second aggregate minimum.

8. The method of claim 1, further comprising, during the execution of the job workload, repeating the second test deployment with the test workload being the measuring workload, a specification of the first candidate node, and measuring a plurality of updated first metric values corresponding to quantifying a response of the first candidate node to the status of the computing resource during the execution of the measuring workload on the first candidate node.

9. The method of claim 8, further comprising:
repeating, during the execution of the job workload, the third test deployment with the test workload being the measuring workload, a specification of the second candidate node, and measuring a plurality of updated second metric values corresponding to quantifying a response of the second candidate node to the status of the computing resource during the execution of the measuring workload on the second candidate node;
determining an updated first total cost function from the plurality of updated first metric values and the cost impact function, and determining an updated second total cost function from the plurality of updated second metric values and the cost impact function;
determining an updated first minimum of the updated first total cost function and an updated second minimum of the updated second total cost function;
based on the updated first minimum and the updated second minimum, selecting one of the first candidate node and the second candidate node as an updated executing node for executing the job workload; and
in case the updated executing node differs from the executing node, relocating the job workload to the updated executing node.

10. The method of claim 9, wherein:
the determination of the first and second total cost functions, the determination of the updated first and second minima and the selection of the updated executing node being performed only in case that at least one of the following is true: (i) the plurality of updated first metric values differ from the plurality of first metric values, (ii) the plurality of updated second metric values differ from the plurality of second metric values, and (iii) the execution requirement differs from the execution requirement used during the test deployment with the metric being the first or second metric.

11. The method of claim 9, further comprising querying an owner of the job workload for an approval for the relocation, the relocation being performed only in response to receiving the approval.

12. The method of claim 9, wherein the infrastructure further comprises a load balancing node, execution of the job workload by the executing node being performed as a former instance, the relocation comprising causing the executing node to provision a new instance of the job workload, causing the executing node to halt execution of a previous instance, migrating one or more artifacts of the job workload from the executing node to the updated executing node, causing the updated executing node to register the new instance at the load balancing node, causing the updated executing node to execute the new instance, causing the load balancing node to deregister the former instance, and causing the executing node to destroy the former instance.

13. The method of claim 1, wherein the execution requirement comprises a compulsory condition, the selection of the first and the second candidate node further comprising preventing the selection of a given work node as the first or the second candidate in case the given work node is unsupportive of the compulsory condition.

14. The method of claim 1, wherein the execution requirement comprises two or more binary security and/or compliance conditions, the selection of the executing node comprising determining a compliance counter for each of the first and the second candidate node, the compliance counter for a given candidate node comprising a quantity of the security and/or compliance conditions which can be fulfilled by the given candidate node, the selection of the executing node further comprising selecting the given candidate node if the compliance counter is largest and the respective first or second minimum of the given candidate node is less than or equal to a predefined total cost threshold value.

15. The method of claim 1, further comprising receiving failure notifications related to the executing node, determining a first correlation metric from the failure notifications received within a predetermined time window, and in case the first correlation metric lies within a predetermined first correlation range, determining out of the two or more work nodes a first group of safe work nodes from which no correlated failure notification was received, selecting a first safe executing node from the first group of safe work nodes, and relocating the job workload to the first safe executing node.

16. The method of claim 15, the selection of the first safe executing node comprising, for each safe work node in the first group of safe work nodes, performing an additional test deployment with the test workload being the measuring workload, a specification of the safe work node, and measuring a plurality of third metric values; determining a third total cost function from the plurality of third metric values and the cost impact function; and determining a third minimum of the third total cost function, the selection of the first safe executing node further comprising selecting a given safe work node out of the first group of safe work nodes as the first safe executing node if the third minimum is smallest.

17. The method of claim 1, further comprising receiving a hazard forecast, determining a second correlation metric between the hazard forecast and each of the work nodes, and in case the second correlation metric between the hazard forecast and the executing node lies within a predetermined second correlation range, determining out of the two or more work nodes a second group of safe work nodes for which the second correlation metric lies out of the second correlation range, selecting a second safe executing node from the group of safe work nodes, and relocating the job workload to the second safe work node.

18. The method of claim 17, the selection of the second safe executing node comprising, for each safe work node in the second group of safe work nodes, performing an additional test deployment with the test workload being the measuring workload, a specification of the safe work node, and measuring a plurality of fourth metric values; determining a fourth total cost function from the plurality of fourth metric values and the cost impact function; and determining a fourth minimum of the fourth total cost function, the selection of the second safe executing node further comprising selecting a given safe work node out of the second group of safe work nodes as the second safe executing node if the fourth minimum is smallest.

19. The method of claim 1, wherein the selection of the executing node comprises selecting the first candidate node where the first minimum is less than or equal to the second minimum, and selecting the second candidate node where the first minimum is greater than the second minimum.

20. The method of claim 1, wherein the test metric comprises one or more of the following: a processing time or rate of the execution of the test workload by the test node; a response time or rate of the test node during the execution of the test workload; an availability figure of the test node during the execution of the test workload; a service figure descriptive of a service level fulfilled by the test node during the execution of the test workload; a binary status of fulfillment of a security, compliance, or service condition by the test node during the execution of the test workload; a disaster recovery time or rate of the test node; and a price charged for a service used or implemented by the test node for the execution of the test workload.

21. The method of claim 1, wherein the distributed computing infrastructure comprises a cloud computing environment, the execution of the job workload being provided as a service in the cloud computing environment, the method being implemented as a function of a management layer of the cloud computing environment.

22. The method of claim 1, the first and the second candidate node being operated by different service providers of the service.

23. A computer program product, in particular a computer readable storage medium, the computer program product carrying computer-executable instructions for execution by a processor controlling an apparatus, wherein execution of the instructions causes the processor to perform a method utilizing a plurality of test deployments for executing a job workload in a distributed computing infrastructure comprising a broker node and a plurality of work nodes from a plurality of service providers, the job workload having an execution requirement related to computing resources of the plurality of work nodes, the method comprising:
  performing a first test deployment, comprising:
    receiving a first test workload, the first test workload having assigned the execution requirement of the job workload;
    querying a cloud service provider registry to identify a set of eligible work nodes from the plurality of cloud service providers;
    matching three or more work nodes from the set of eligible work nodes based, at least in part, on the execution requirement and a plurality of service specifications of the set of eligible work nodes;
    receiving a specification of a test node out of the three or more work nodes;
    providing the first test workload to the test node;
    instructing the test node to execute the first test workload a plurality of times using the computing resource and observe a plurality of test metrics quantifying responses of the test node to a status of a computing resource of the test node with respect to the execution requirement during the plurality of executions of the first test workload by:
      instructing the test node to vary the status of the computing resource of the test node, execute the first test workload using the varied status; and in response to each execution of the test workload by the test node:
receiving a test metric, the test metric quantifying a response of the test node to the status of the computing resource with respect to the execution requirement during the execution;
the method further comprising, by the broker node, in response to performing the first test deployment:
creating a measuring workload, the measuring workload having assigned the execution requirement and wherein the measuring workload is derived from the job workload to reflect the resource consumption conditions of the job workload while exhibiting a substantially smaller computing resource consumption than the job workload,
selecting a first and a second candidate node out of the three or more work nodes other than the test node,
performing a second test deployment with a second test workload being the measuring workload, a specification of the first candidate node, and measuring a plurality of first metric values, based on the plurality of test metrics, from performance of the second test deployment,
performing a third test deployment with a third test workload being the measuring workload, a specification of the second candidate node, and measuring a plurality of second metric values, based on the plurality of test metrics, from performance of the third test deployment,
determining a cost impact function of the plurality of test metrics,
determining a first total cost function from the plurality of first metric values and the cost impact function, and determining a second total cost function from the plurality of second metric values and the cost impact function,
determining a first minimum of the first total cost function and a second minimum of the second total cost function,
based on the first minimum and the second minimum, selecting one of the first candidate node and the second candidate node as an executing node for executing a job workload that minimizes a cost, and
causing the executing node to execute the job workload.

24. A computer system for performing a method utilizing a plurality of test deployments for executing a job workload in a distributed computing infrastructure comprising a broker node and a plurality of work nodes from a plurality of cloud service providers, the job workload having an execution requirement related to computing resources of the plurality of work nodes, the system comprising:
a processor set; and
a computer readable storage medium;
wherein the processor set is structured, located, connected and/or programmed to run program instructions stored on the computer readable storage medium; and the program instructions include instructions programmed to perform the method comprising:
receiving a first test workload, the first test workload having assigned the execution requirement of the job workload;
querying a cloud service provider registry to identify a set of eligible work nodes from the plurality of cloud service providers;
matching three or more work nodes from the set of eligible work nodes based, at least in part, on the execution requirement and a plurality of service specifications of the set of eligible work nodes;
receiving a specification of a test node out of the three or more work nodes;
providing the first test workload to the test node;
instructing the test node to execute the first test workload a plurality of times using the computing resource and observe a plurality of test metrics quantifying responses of the test node to a status of a computing resource of the test node with respect to the execution requirement during the plurality of executions of the first test workload by:
instructing the test node to vary the status of the computing resource of the test node, execute the first test workload using the varied status; and
in response to each execution of the first test workload by the test node;
receiving a test metric, the test metric quantifying a response of the test node to the status of the computing resource with respect to the execution requirement during the execution;
the method further comprising, by the broker node, in response to performing the first test deployment:
creating a measuring workload, the measuring workload having assigned the execution requirement, and wherein the measuring workload is derived from the job workload to reflect the resource consumption conditions of the job workload while exhibiting a substantially smaller computing resource consumption than the workload,
selecting a first and a second candidate node out of the three or more work nodes other than the test node,
performing a second test deployment with a second test workload being the measuring workload, a specification of the first candidate node, and measuring a plurality of first metric values, based on the plurality of test metrics, from performance of the second test deployment,
performing a third test deployment with a third test workload being the measuring workload, a specification of the second candidate node, and measuring a plurality of second metric values, based on the plurality of test metrics, from performance of the third test deployment,
determining a cost impact function of the plurality of test metrics,
determining a first total cost function from the plurality of first metric values and the cost impact function, and
determining a second total cost function from the plurality of second metric values and the cost impact function,
determining a first minimum of the first total cost function and a second minimum of the second total cost function,
based on the first minimum and the second minimum, selecting one of the first candidate node and the second candidate node as an executing node for executing a job workload that minimizes a cost, and
causing the executing node to execute the job workload.

* * * * *